United States Patent [19]
Nomoto et al.

[11] Patent Number: 4,665,690
[45] Date of Patent: May 19, 1987

[54] EXHAUST GAS CLEANING SYSTEM FOR VEHICLE

[75] Inventors: Yoshitaka Nomoto; Hirofumi Yamauchi; Shigeru Sakurai; Kenji Ohkubo; Hideaki Kurita; Kunihiro Yagi, all of Hiroshima, Japan

[73] Assignee: Mazda Motor Corporation, Hiroshima, Japan

[21] Appl. No.: 817,618

[22] Filed: Jan. 10, 1986

[30] Foreign Application Priority Data

Jan. 14, 1985 [JP] Japan .................................. 60-4705
Jan. 14, 1985 [JP] Japan .................................. 60-4706

[51] Int. Cl.⁴ .............................................. F01N 3/02
[52] U.S. Cl. .................................... 60/286; 55/283; 55/DIG. 10; 55/DIG. 30; 60/288; 60/295; 422/107; 422/111; 422/178; 422/223
[58] Field of Search ......................... 60/286, 288, 295; 55/283, DIG. 10, DIG. 30; 422/107, 111, 178, 223

[56] References Cited

U.S. PATENT DOCUMENTS

| 4,436,535 | 3/1984 | Erdmannsdorfer | 422/178 |
| 4,450,682 | 5/1984 | Sato | 55/DIG. 30 |
| 4,462,208 | 7/1984 | Hicks | 60/286 |

FOREIGN PATENT DOCUMENTS

| 725371 | 1/1966 | Canada | 60/295 |
| 2134408 | 8/1984 | United Kingdom | 60/286 |

Primary Examiner—Douglas Hart
Attorney, Agent, or Firm—Gerald J. Ferguson, Jr.; Michael P. Hoffman; Ronni S. Malamud

[57] ABSTRACT

An internal combustion engine is provided in its exhaust system with a particulate filter for trapping combustible particulates contained in exhaust gas. A combustion promoting material injection device is provided for injecting a material for promoting combustion of the combustible particulates into the exhaust system upstream of the particulate filter. Further there are provided a bypass exhaust passage which bypasses the combustion promoting material injection device and the particulate filter, and a flow control valve which controls the amount of exhaust gas flowing through the bypass exhaust passage to control the amount of exhaust gas flowing into the particulate filter when said combustion promoting material is to be injected from the injecting device. When the combustion promoting material is injected, the flow control valve controls the amount of exhaust gas flowing into the particulate filter so that the combustion promoting material can uniformly adhere to the surface of the combustible particulates over the entire area thereof and so that the combustion temperature of the combustible particulates is prevented from rising abnormally high.

24 Claims, 24 Drawing Figures

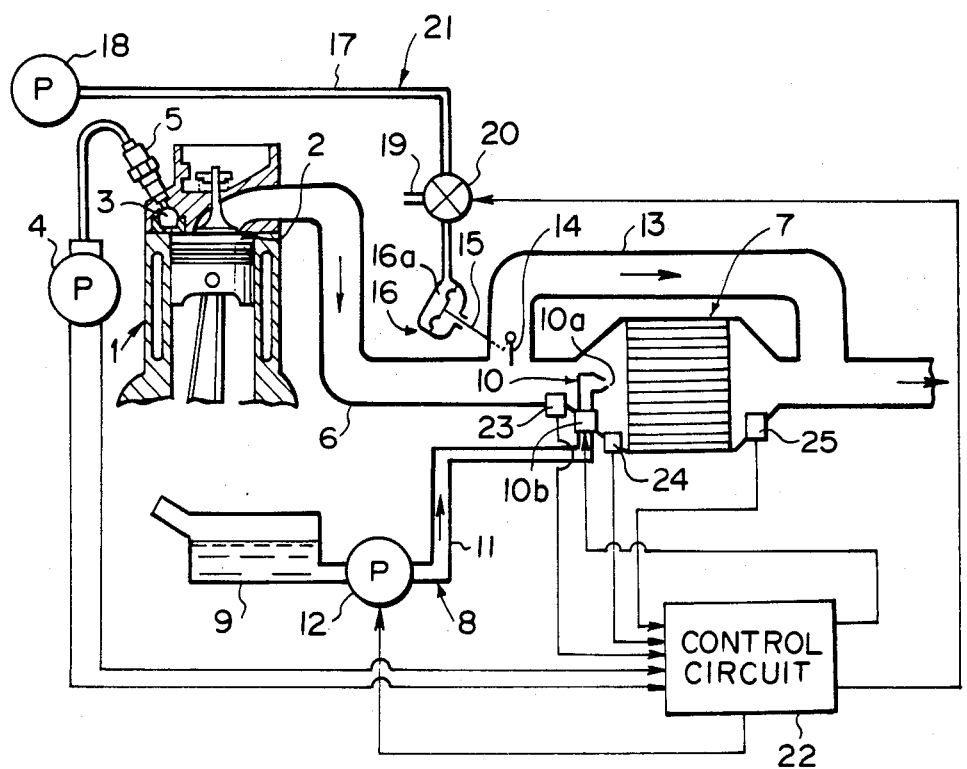
F I G. 1

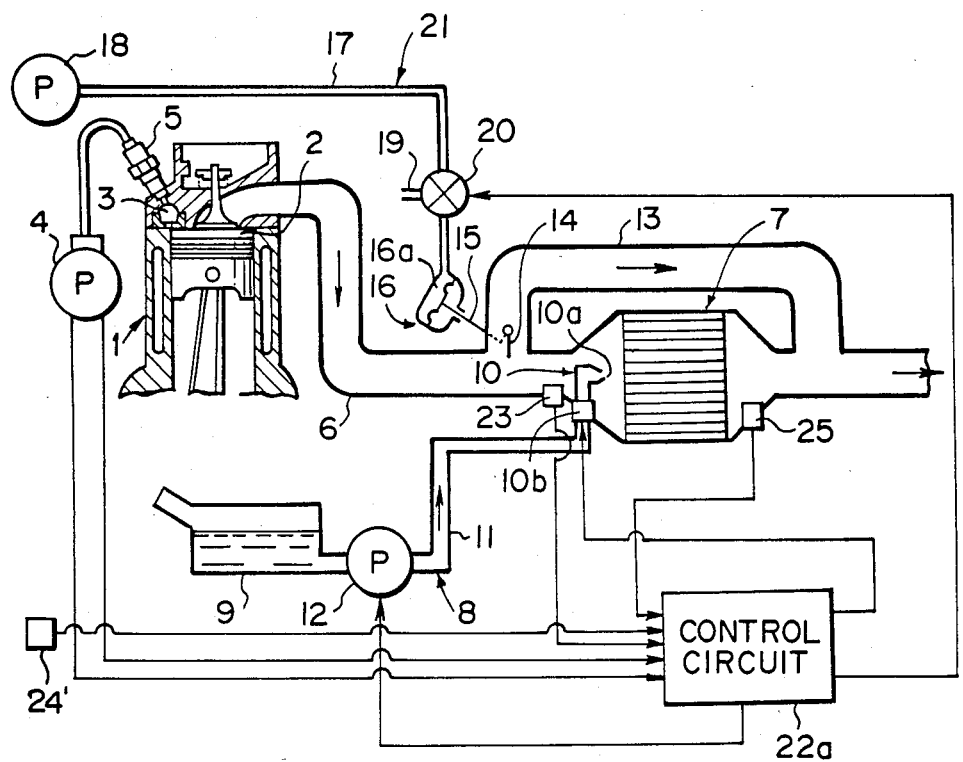
F I G. 7

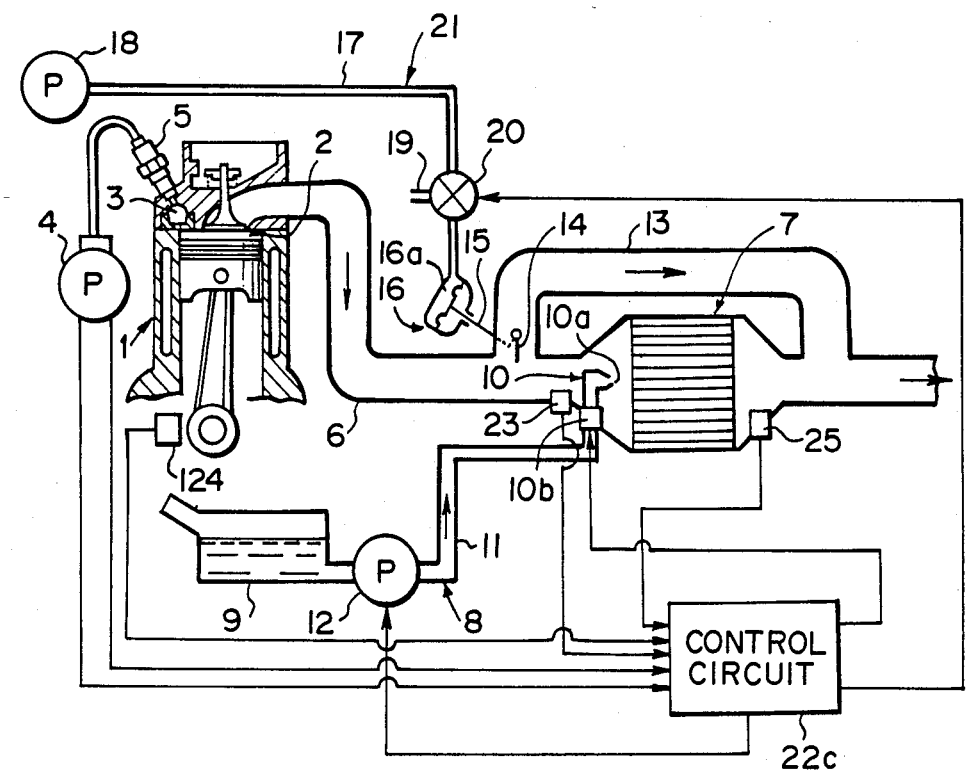
F I G. 15

F I G. 18
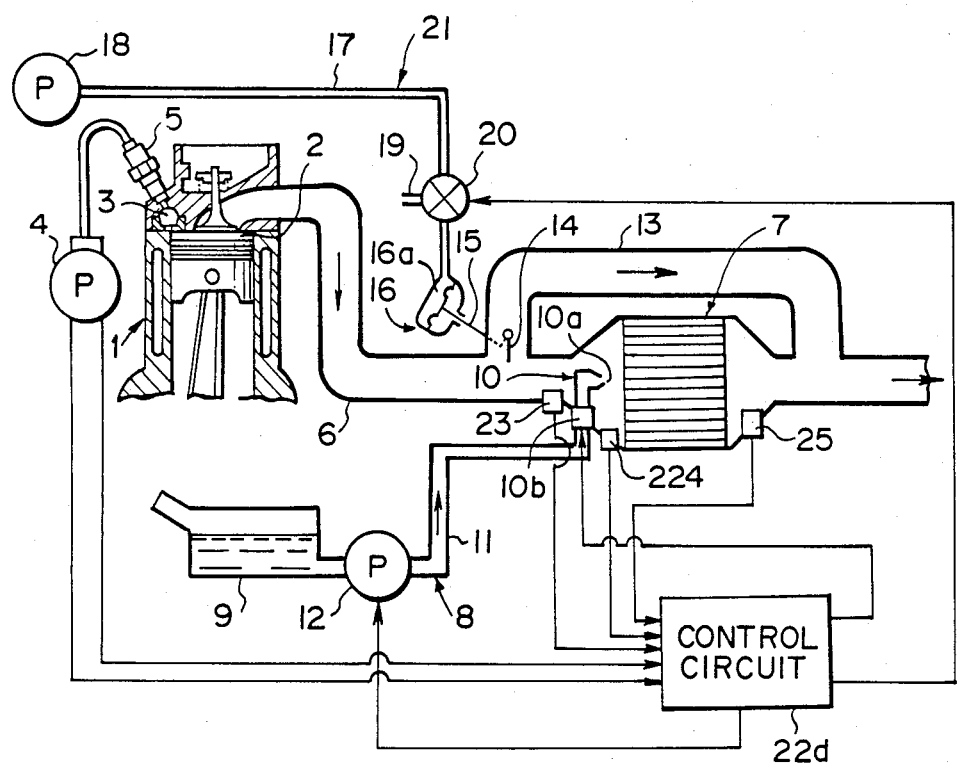

EXHAUST GAS CLEANING SYSTEM FOR VEHICLE

BACKGROUND OF THE INVENTION

1. Field of the Invention

This invention relates to an exhaust gas cleaning system for an internal combustion engine, and more particularly to an exhaust gas cleaning system which traps and burns combustible particulates contained in exhaust gas of, for instance, a diesel engine.

2. Description of the Prior Art

There have been known various exhaust gas cleaning systems. In the system disclosed in Japanese Unexamined Patent Publication No. 56(1981)-98519, a catalytic filter for trapping and oxidizing combustible particulates in the exhaust gas is provided in the exhaust system of an engine, and an auxiliary fuel injection system for injecting liquid or gaseous auxiliary fuel is provided in the exhaust system upstream of the catalytic filter, whereby the exhaust gas temperature is raised above the ignition point of the combustible particulates by oxidization under catalytic action of the catalytic filter and combustion promoting effect of the auxiliary fuel so that the combustible particulates are burnt and removed from the catalytic filter to refresh the filter.

However, the conventional system is disadvantageous in that since the exhaust gas temperature is relatively low (200° to 300° C. in the case of diesel engines) when the engine is in the steady operating range, the exhaust gas cannot be heated above the ignition point of the combustible particulates regardless of the combustion promoting effect of the auxiliary fuel, and accordingly the combustible particulates cannot be sufficiently burnt. When combustion of the trapped combustible particulates is unsatisfactory, the catalytic filter cannot be sufficiently refreshed and clogging of the filter will occur so that the back pressure of the engine is increased to the point that normal operation of the engine is prevented.

As disclosed in our Japanese patent application No. 59(1984)-64627, the ignition point of the combustion particulates can be lowered so that the combustible particulates can be positively burnt even during the steady operation of the engine in which the exhaust gas temperature is relatively low by providing a particulate filter having only particulates-trapping function but no catalytic effect in the exhaust system instead of the catalytic filter and by injecting into the exhaust passage upstream of the particulate filter a material for promoting combustion of the combustible particulates. The combustion promoting material may generally comprise an emulsion of a mixture of a catalytic component and a hydrocarbon component. By injecting the combustion promoting material into the exhaust system upstream of the particulate filter, the catalytic component and the hydrocarbon component uniformly adhere to the surface of the combustible particulates trapped by the particulate filter. This substantially lowers the ignition point of the combustible particulates. However, this technique has been found to be disadvantageous in that when the combustion promoting material is injected during the high speed operation of the engine in which the amount of exhaust gas is large, the injection flow of the combustion promoting material is disturbed by the high-speed exhaust gas and the combustion promoting material does not uniformly adhere to the surface of the combustible particulates over the entire area thereof.

Further, when the amount of exhaust gas is large, the exhaust gas temperature is generally high and the combustion temperature is apt to become abnormally high. As a result, cracks are liable to be produced in the filter.

SUMMARY OF THE INVENTION

In view of the foregoing observations and description, the primary object of the present invention is to provide an exhaust gas cleaning system in which the combustible particulates trapped by the filter can be satisfactorily burnt even when the exhaust gas temperature is relatively low and at the same time the combustion of the combustible particulates can be reliably controlled if the exhaust gas temperature should become high.

In accordance with the present invention, a particulate filter for trapping combustible particulates contained in exhaust gas is provided in the exhaust system and a combustion promoting material injection device is provided for injecting a material for promoting combustion of the combustible particulates into the exhaust system upstream of the particulate filter. Further there are provided a bypass exhaust passage which bypasses the combustion promoting material injection device and the particulate filter, and a flow control valve means which controls the amount of exhaust gas flowing through the bypass exhaust passage to control the amount of exhaust gas flowing into the particulate filter when said combustion promoting material is to be injected from the injecting device. When the combustion promoting material is injected, the flow control valve means controls the amount of exhaust gas flowing into the particulate filter so that the combustion promoting material can uniformly adhere to the surface of the combustible particulates over the entire area thereof and so that the combustion temperature of the combustible particulates is prevented from rising abnormally high.

In one embodiment of the present invention, the flow control valve means controls the amount of exhaust gas flowing into the filter so as to keep it at a preset value. In another embodiment of the present invention, the flow control valve means closes the passage to the filter so that all exhaust gas flows through the bypass exhaust passage and the combustion promoting material is injected with no exhaust gas flowing into the filter when the temperature upstream of the filter becomes lower than a preset temperature which is determined, for instance, taking into account the boiling temperature of the solvent used in the combustion promoting material.

Preferably the combustion promoting material comprises a catalytic component and a hydrocarbon component, but it may comprise only one of these. Further, the combustion promoting material is generally in the form of liquid but it need not be in liquid form.

BRIEF DESCRIPTION OF THE DRAWINGS

FIG. 1 is a schematic view of a diesel engine provided with an exhaust gas cleaning system in accordance with a first embodiment of the present invention, FIG. 7 is a schematic view of a diesel engine provided with an exhaust gas cleaning system in accordance with a modification of the first embodiment, FIG. 15 is a schematic view of a diesel engine provided with an exhaust gas cleaning system in accordance with still another modification of the first embodiment, FIG. 18 is a schematic view of a diesel engine provided with an exhaust gas cleaning system in accordance with still another modification of the first embodiment.

DESCRIPTION OF THE PREFERRED EMBODIMENTS

Figure 2:
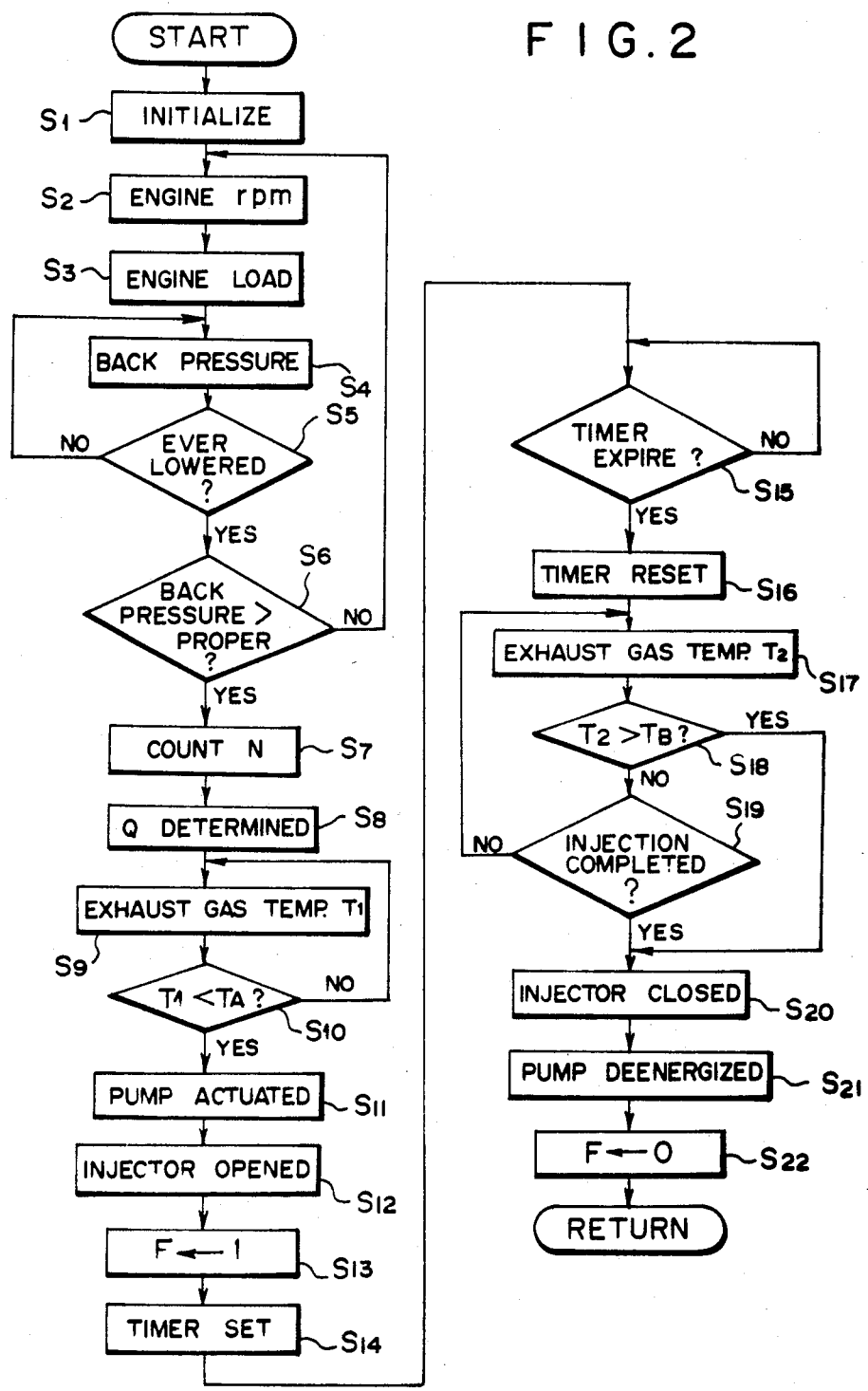
FIGS. 2 and 3 are flow charts for illustrating the operation of the control circuit employed in the exhaust gas cleaning system of FIG. 1.

In FIG. 1, reference numerals 2 and 3 respectively denote a combustion chamber and a swirl chamber of a swirl chamber type diesel engine 1. The swirl chamber 3 is provided with a fuel injection nozzle 5 which injects fuel from a fuel pump 4 into the swirl chamber 3. The fuel pump 4 is driven by the engine 1.

Exhaust gas in the combustion chamber 2 is discharged through an exhaust passage 6 which is provided, at an intermediate portion thereof, with a particulate filter 7 for trapping combustible particulates containing carbon as the major component. The particulate filter 7 is in the form of a known honeycomb structure of porous material. That is, the honeycomb structure has a plurality of passages axially extending in parallel to each other, each of the passages being opened at one end and closed at the other end so that, in each end face of the honey comb structure, the passages are alternately opened and closed. When exhaust gas passes through the partition wall between adjacent passages, the particulates contained therein are filtered off.

Reference numeral 8 denotes a combustion promoting material injection device for injecting a material for promoting combustion of the combustible particulates into the exhaust passage 6 upstream of the particulate filter 7. The material is a liquid in this particular embodiment, and comprises an aqueous emulsion of a catalytic component which may be of 0.05 to 0.5% by weight of a water-soluble compound of one or more platinum group metals (Pt, Pd, Rh, Ir) or of 1 to 10% by weight of water-soluble salt of one or more base metals (V, Cr, Fe, Ni, Mo, Ca, Ba); 10 to 50% by weight of a hydrocarbon such as kerosine, gas oil, heavy oil, alcohol, ketone (oxygen-containing hydrocarbon) and or like; and 1 to 10% by weight of a surface-active agent for bringing the hydrocarbon into solution.

The combustion promoting material injecting device 8 comprises a reservoir 9 for storing the combustion promoting liquid, an injector 10 which is provided with a solenoid valve 10b and is disposed in the exhaust passage 6 upstream of the particulate filter 7 with its injecting hole 10a directed toward the particulate filter 7, a communicating pipe 11 for connecting the injector 10 to the reservoir 9 and an electric pump 12 disposed in the communicating pipe 11 at an intermediate portion thereof. The combustion promoting liquid stored in the reservoir 9 is injected toward the filter 7 in a predetermined amount (e.g., 10 to 100 cc) by operating the pump 12 and opening the solenoid valve 10b.

The portion of the exhaust passage 6 upstream of the injector 10 and the portion of the same downstream of the particulate filter 7 are connected with each other by a bypass exhaust passage 13 so that the exhaust gas from the engine 1 can bypass the injector 10 and the particulate filter 7 by flowing through the bypass exhaust passage 13.

A flow control valve 14, which is in the form of a butterfly valve, is disposed in the bypass exhaust passage 13 near the upstream side junction of the bypass exhaust passage 13 with the exhaust passage 6. The flow control valve 14 is operatively connected to a diaphragm device 16 by way of a rod 15. The diaphragm device 16 has a negative pressure chamber 16a communicated with a vacuum pump 18 by way of a negative pressure introduction passage 17. The negative pressure introduction passage 17 is provided, at an intermediate portion thereof, with a duty solenoid valve 20 which is adapted to linearly change the ratio of the effective area by which the negative pressure chamber 16a opens to the atmosphere (by way of a pipe 19) to the effective area by which the negative pressure chamber 16a is communicated with the vacuum pump 18, thereby linearly changing the magnitude of the vacuum force applied to the negative pressure chamber 16a to drive the flow control valve 14. Thus, the diaphragm device 16, the negative pressure introduction passage 17, the vacuum pump 18 and the duty solenoid valve 20 form a driving means 21 for driving the flow control valve 14.

Reference numeral 22 denotes a control circuit for controlling the solenoid valve 10b of the injector 10, the electric pump 12 and the duty solenoid valve 20. Into the control circuit 22 are input a pump rpm signal representing the rpm of the shaft of the fuel pump 4 corresponding to the engine speed, and a control sleeve position signal representing the engine load. Further, into the control circuit 22 are input outputs of a first exhaust gas temperature sensor 23 for detecting the temperature T1 of the exhaust gas in the exhaust passage 6 upstream of the particulate filter 7, a back pressure sensor 24 for detecting the pressure of the exhaust gas in the exhaust passage 6 immediately upstream of the particulate filter 7, i.e., the back pressure of the engine 1, and a second exhaust gas temperature sensor 25 for detecting burning condition of the combustible particulates in the particulate filter 7 by way of the temperature T2 of the exhaust gas in the exhaust passage 6 immediately downstream of the particulate filter 7. The control circuit 22 detects the operating range of the engine 1 on the basis of the pump rpm signal and the control sleeve position signal and reads out a proper back pressure for the detected operating range, that is, the value which the back pressure should assume when the particulate filter 7 is not clogged. The read-out proper back pressure is compared with the actual back pressure detected by the back pressure sensor 24 to determine whether the particulate filter 7 is clogged. When the actual back pressure is higher than the proper back pressure and it is determined that the filter 7 is clogged, the control circuit 22 actuates the solenoid valve 10b of the injector 10 and the electric pump 12 of the combustion promoting material injecting device 8, and controls the duty solenoid valve 20 to control the flow control valve 14 so that the amount of the exhaust gas flowing through the filter 7 is fixed to a preset value, i.e., so that the back pressure detected by the back pressure sensor 24 is substantially fixed.

The operation of the control circuit 22 will be described in more detail with reference to the flow charts shown in FIGS. 2 and 3, hereinbelow.

In FIG. 2, step S1 is an initializing step in which the flow control valve 14 is closed to close the bypass exhaust passage 13. In steps S2 and S3, the engine speed and the engine load are respectively detected on the basis of the shaft rpm and the control sleeve position of the fuel pump 4. In step S4, the back pressure of the engine 1 is detected on the basis of the output signal of the back pressure sensor 24, and in step S5, it is determined whether the back pressure has ever been lowered to a proper value which is predetermined for the operating range of the engine 1 detected in the steps S2 and S3, that is, it is determined whether the combustible particulates trapped by the filter 7 have ever been burnt. When it is not determined that the back pressure has been once lowered to the predetermined proper back pressure, the control circuit 22 returns to the step S4 to repeat the steps S4 and S5. When it is determined in the step S5 that the back pressure has been once lowered to the predetermined proper back pressure, it is determined in step S6 whether the back pressure detected in the step S4 is higher than the predetermined proper back pressure, that is, whether the particulate filter 7 is clogged by the combustible particulates trapped thereby. When it is determined that the filter 7 is clogged, the control circuit 22 proceeds to step S7. Otherwise, the control circuit 22 returns to the step S2 to repeat the steps S2 to S6.

Figure 4:
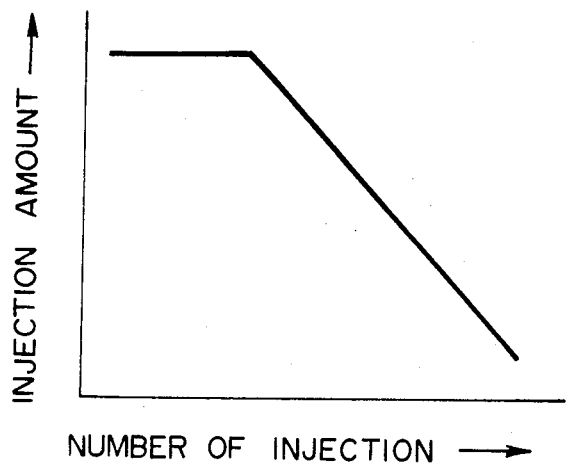
FIG. 4 shows a characteristic curve employed in the embodiment of FIG. 1 to determined the amount of combustion promoting material according to the number of injections.

In the step S7, the number of injections N of the combustion promoting material which have been made by that time is counted, and in step S8, the amount of the combustion promoting material to be injected at that time Q is read out from a map shown in FIG. 4 in which the amount of the combustion promoting material to be injected Q is related to the number of injections N. In the injection amount characteristics shown in FIG. 4, the injection amount is reduced as the number of injections N increases. This is because catalytic component in the combustion promoting material is accumulated in the particulate filter 7 as the number of injections N increases and the accumulated catalytic component can contribute to promotion of combustion. This is advantageous in that consumption of the catalytic component can be reduced, this lowering the operating cost.

Figure 5:
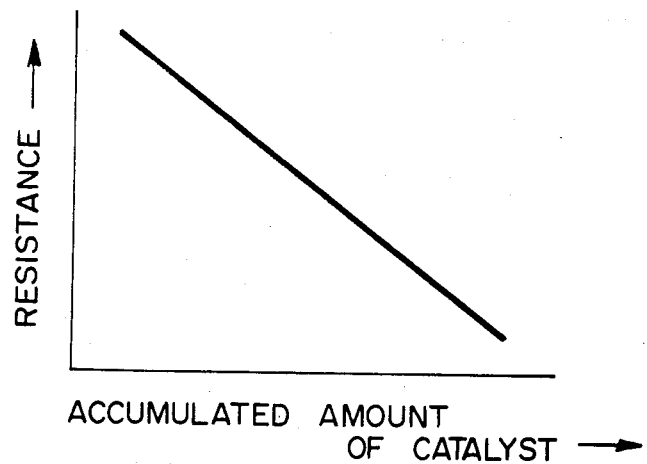
FIG. 5 is a graph showing the relation between the electric resistance and the amount of catalytic component accumulated in the particulate filter.

Instead of determining the injection amount Q taking into account the number of injections N, the injection amount Q may be determined taking into account the electrical resistance of the particulate filter 7. That is, since the catalytic component is conductive, the resistance of the particulate filter 7 is reduced as the amount of accumulated catalytic component increases as shown in FIG. 5. Accordingly, by embedding a pair of electrodes in end portions of the particulate filter 7 and measuring the electrical resistance between the electrodes after refreshing the filter 7, the amount of the accumulated catalytic component can be directly detected.

After the injection amount Q is thus determined, the exhaust gas temperature T1 of the engine 1 is detected on the basis of the output of the first exhaust gas temperature sensor 23 in step S9. Further, in step S10, it is determined whether the exhaust gas temperature T1 is lower than an acceptable limit of the exhaust gas temperature $T_A$ which is determined taking into account the lower limit of the exhaust gas temperature below which cracking of the filter 7 does not occur during combustion of the combustible particulates caused by injection of the combustion promoting material. When it is not determined that the former is lower than the latter, it is considered that cracks will be produced in the filter 7 if the combustion promoting material is injected to burn the combustible particulates in the filter 7, and the control circuit 22 returns to the step S9 to repeat the steps S9 and S10 until the former becomes lower than the latter.

Figure 3:
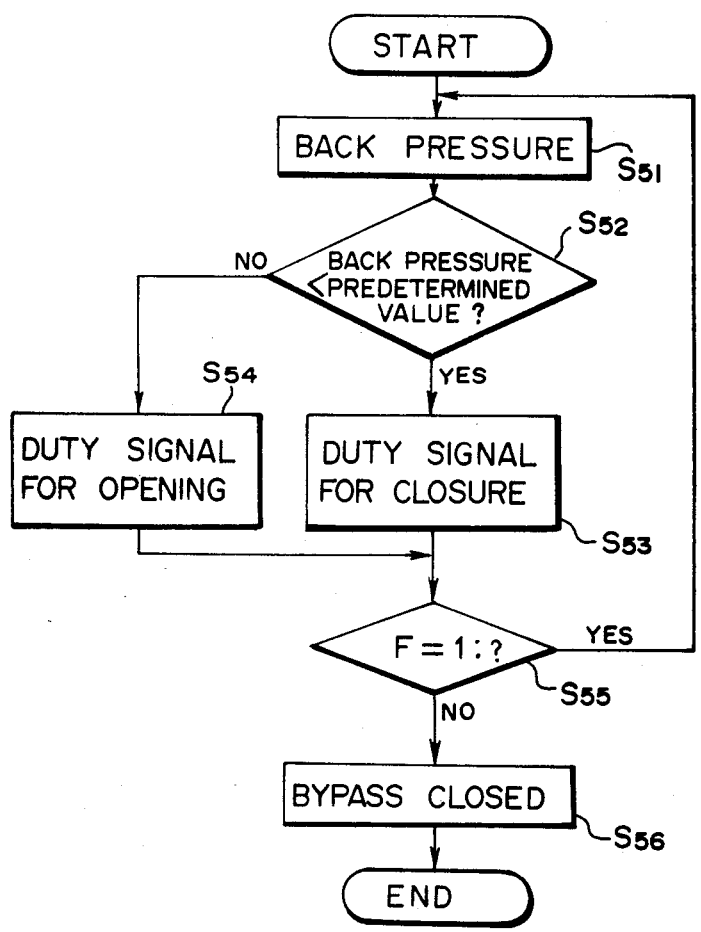

When it is determined that the former is lower than the latter in the step S10, a combustion promoting material injecting routine is carried out according to steps S11 to S21, and an exhaust gas amount control sub-routine is carried out in parallel according to steps S51 to S56 shown in FIG. 3. In the step S11, the electric pump 12 of the combustion promoting material injecting device 8 is energized, and then in the step S12, the solenoid valve 10b of the injector 10 is opened to inject the combustion promoting material toward the filter 7. This condition is memorized by setting a flag F to 1 in the step S13, and then a timer is set in the step S14. In the step S15, it is determined, on the basis of the timer set in the step S14, whether a predetermined time has lapsed since injection of the combustion promoting material began, the predetermined time being determined taking into account the time required for the combustible particulates to be satisfactorily burnt. When the time gas lapsed, the timer is reset in the step S16 and the exhaust gas temperature T2 downstream of the filter 7, that is, the exhaust gas temperature raised by the combustion of the combustible particulates, is detected on the basis of the output signal of the second exhaust gas temperature sensor 25. In the step S18, it is determined whether the exhaust gas temperature T2 downstream of the filter 7 is higher than a limit of the exhaust gas temperature $T_B$ downstream of the filter 7 which is determined taking into account the lower limit of the exhaust gas temperature downstream of the filter 7 below which cracking of the filter 7 does not occur during combustion of the combustible particulates. When it is not determined that the former is higher than the latter, it is determined in the step S19 whether the electric pump 12 has been energized for a time interval which is determined corresponding to the injection amount Q determined in the step S8. When it is not determined that the electric pump 12 has been energized for the time interval, or it is determined that the injection of the combustion promotin9 material by the amount Q is not completed yet, the control circuit 22 returns to the step S17 to continue the injection. Otherwise, the control circuit 22 proceeds to the step S20, and closes the solenoid valve 10b of the injector 10. In the step S21, the electric pump 12 is deenergized to stop injection of the combustion promoting material. Finally, the flag F set to 1 in the step S13 is changed to 0 in the step S22, and then the control circuit 22 returns to the step S1. On the other hand, when it is determined that the exhaust gas temperature T2 downstream of the filter 7 is higher than the limit of the exhaust gas temperature $T_B$ downstream of the filter 7, it is considered that the burning temperature of the combustible particulates has become abnormally high, and the injection of the combustion promoting material is immediately stopped according to the steps S20 to S22.

In the exhaust gas amount control sub routine, the back pressure upstream of the filter 7 is first detected by the back pressure sensor 24 to indirectly detect the amount of exhaust gas flowing through the filter 7 in the step S51. In the next step S52, it is determined whether the back pressure detected in the step S51 is lower than a predetermined value which is determined corresponding to a proper amount of exhaust gas flowing through the filter 7. When it is determined that the former is lower than the latter, a duty signal for reducing the opening degree of the flow control valve 14 to thereby increase the amount of exhaust gas flowing through the filter 7 is delivered to the duty solenoid valve 20 in the step S53. Otherwise, as is generally the case when the engine speed is high, a duty signal for increasing the opening degree of the flow control valve 14 to thereby reduce the amount of exhaust gas flowing through the filter 7 is delivered to the duty solenoid valve 20 in the step S54. Thus, the amount of exhaust gas flowing through the filter is kept at a preset value. In the step S55, it is determined whether the flag F in the combustion promoting material injection routine is 1 and the steps S51 to S55 are repeated until it is determined that the flag F is not 1 in the step S55. When it is determined that the flag F is not 1 but 0 in the step S55, the flow control valve 14 is closed to close the bypass exhaust passage 13 in the step S56, and thus, the exhaust gas amount control is ended.

Thus, in this embodiment, while the combustion promoting material, which is liquid in this particular embodiment, is injected toward the particulate filter 7, the amount of exhaust gas flowing through the filter 7 is kept at a preset value by controlling the flow control valve 14. Accordingly, the combustion promoting material can be injected in an optimal manner so that the material can uniformly adhere to the surface of the filter 7 over the entire area thereof, whereby the filter 7 can be refreshed in an optimal manner.

Further, since the amount of exhaust gas fed to the filter during injection of the combustion promoting material is kept substantially constant even during the high speed operation of the engine in which the amount of exhaust gas discharged from the engine is very large, the burning temperature of the combustible particulates can be prevented from becoming abnormally high and causing cracks to be produced in the filter 7.

Figure 6:
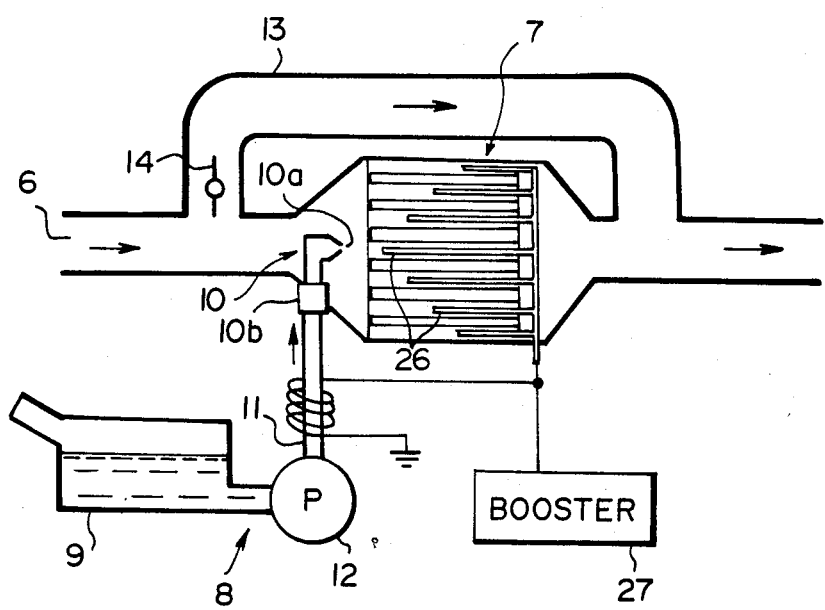
FIG. 6 is a fragmentary schematic view for illustrating a modification of the embodiment shown in FIG. 1.

In the modification shown in FIG. 6, a plurality of elongated electrodes 26 are inserted into the passages of the filter 7 from the downstream side end thereof. The length of the electrode is the maximum at the center of the filter 7 and decreases toward the periphery. To the electrodes 26 and the injector 10 is applied a voltage of the same polarity by a booster winding 27 so that the injected combustion promoting material can be distributed to the peripheral portion of the filter 7 by the repulsion force caused by electrostatic induction.

Generally, the temperature of the filter is higher at the center than the peripheral portion due to the large amount of exhaust gas passing through the filter 7 before injection of the combustion promoting material, and accordingly the combustible particulates accumulated at the center of the filter 7 begins to burn before those accumulated in the peripheral portion of the same and the passage resistance at the center of the filter 7 is first lowered so that the flow of the injected material tends to converge on the center of filter. This tendency can be reduced by the repulsion force caused by the electrostatic induction. Thus, in accordance with the modification shown in FIG. 6, the combustible particulates can be burnt more uniformly.

In the case that the catalytic component of the combustion promoting material can be magnetized, a magnetic field may be established between the injector 10 and the filter 7 to guide the flow of the injected material for the same purpose as the modification shown in FIG. 6.

A modification of the system shown in FIG. 1 will be described with reference to FIGS. 7 to 9, hereinbelow.

The exhaust gas cleaning system of this modification is very similar to that shown in FIG. 1 except that there is provided, instead of the back pressure sensor 24, a total odometer 24' in order to determine the time the combustion promoting material is to be injected. Accordingly, the parts analogous to the parts shown in FIG. 1 are given the same reference numerals and will not be described here. The total odometer 24' is arranged to output a signal to the control circuit 22a every predetermined travel distance, and the control circuit 22a controls the combustion promoting material injecting device 8 and the flow control valve 14 to inject the combustion promoting material upon receipt of the output signal of the total odometer 24'.

The operation of the control circuit 22a will be described in more detail with reference to the flow charts shown in FIGS. 8 and 9, hereinbelow.

Figure 8:
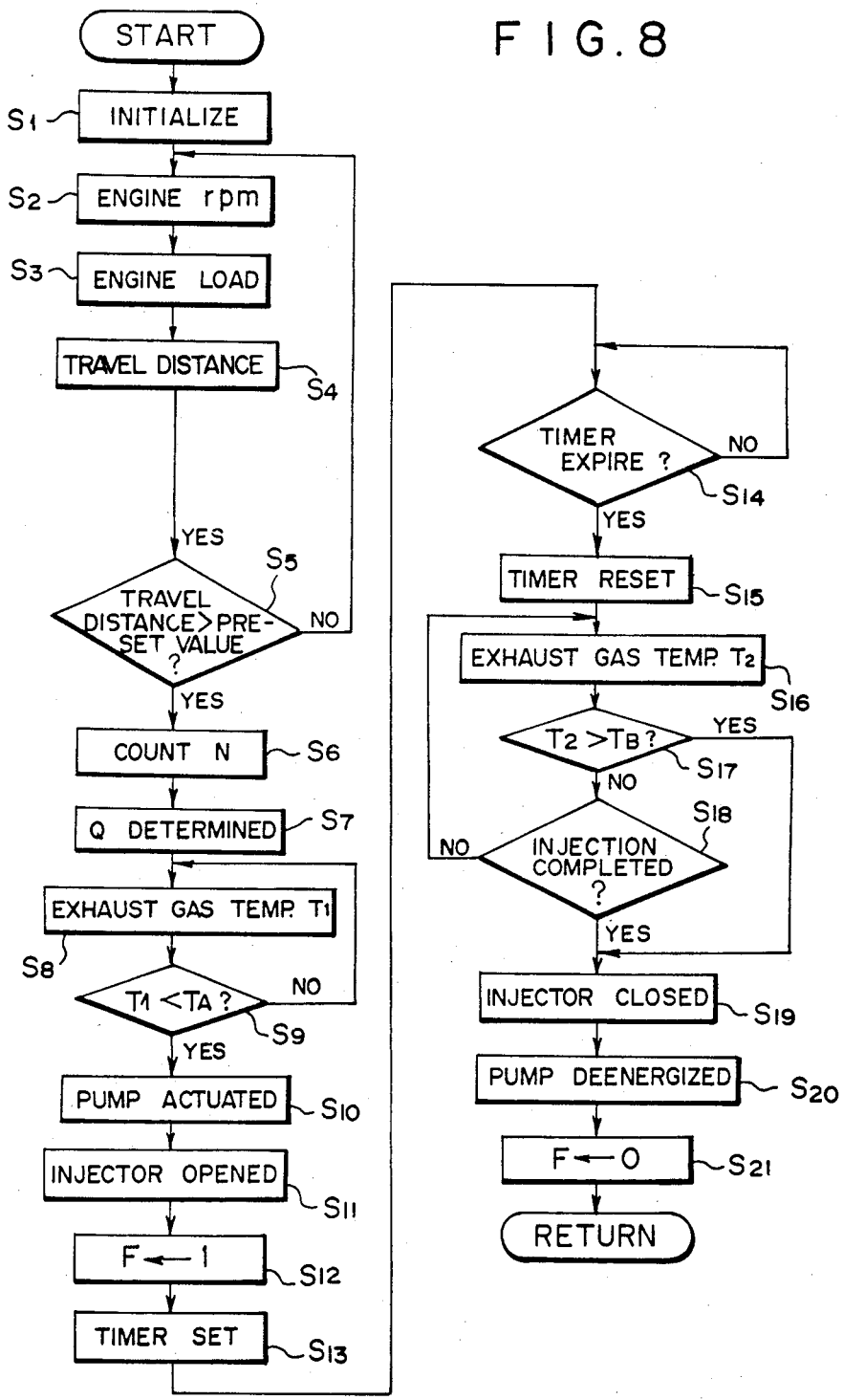
FIGS. 8 and 9 are flow charts for illustrating the operation of the control circuit employed in the exhaust gas cleaning system of FIG. 7, FIGS. 10 and 11 are flow charts for illustrating the operation of the control circuit employed in an exhaust gas cleaning system in accordance with another modification of the first embodiment.

In FIG. 8, step S1 is an initializing step in which the flow control valve 14 is closed to close the bypass exhaust passage 13. In steps S2 and S3, the engine speed and the engine load are respectively detected on the basis of the shaft rpm and the control sleeve position of the fuel pump 4. In step S4, the travel distance is detected on the basis of the output signal of the total odometer 24' and in step S5, it is determined whether the travel distance has reached a predetermined value since the preceding injection of the combustion promoting material. When it is determined that the travel distance has reached the predetermined value, the control circuit 22a proceeds to step S6. Otherwise, the control circuit 22a returns to the step S2 to repeat the steps S2 to S5.

In the step S6, the number of injections N of the combustion promoting material which have been made by that time is counted, and in step S7, the amount of the combustion promoting material to be injected at that time Q is read out from a map shown in FIG. 4 in which the amount of the combustion promoting material to be injected Q is related to the number of injections N.

After the injection amount Q is determined, the exhaust gas temperature T1 of the engine 1 is detected on the basis of the output of the first exhaust gas temperature sensor 23 in step S8. Further, in step S9, it is determined whether the exhaust gas temperature T1 is lower than an acceptable limit of the exhaust gas temperature $T_A$ which is determined taking into account the lower limit of the exhaust gas temperature below which cracking of the filter 7 does not occur during combustion of the combustible particulates caused by injection of the combustion promoting material. When it is not determined that the former is lower than the latter, it is considered that cracks will be produced in the filter 7 if the combustion promoting material is injected to burn the combustible particulates in the filter 7, and the control circuit 22a returns to the step S8 to repeat the steps S8 and S9 until the former becomes lower than the latter.

Figure 9:
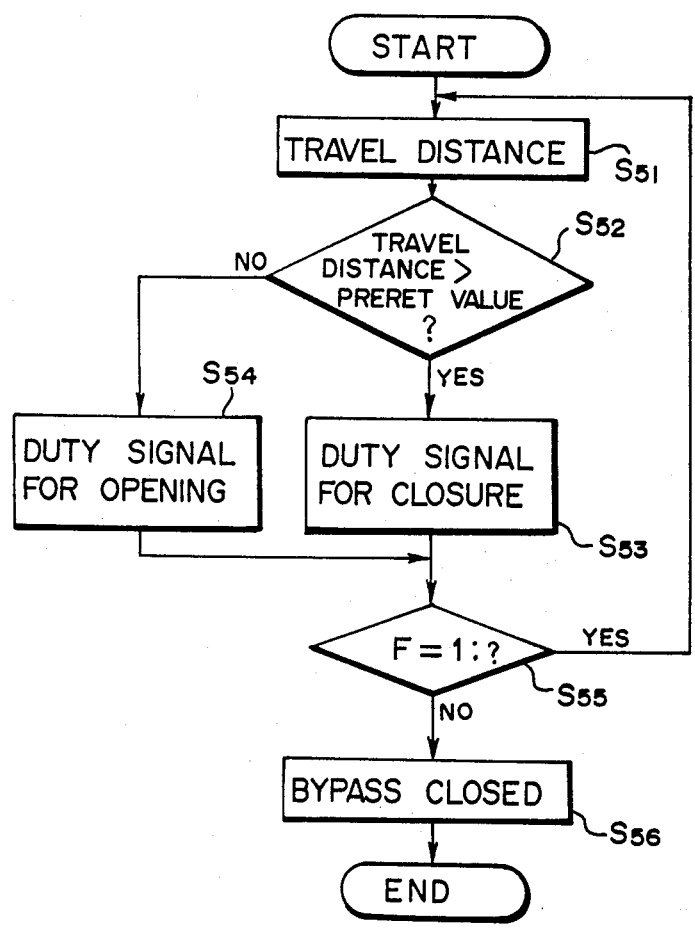

When it is determined that the former is lower than the latter in the step S9, a combustion promoting material injecting routine is carried out according to steps S10 to S21, and an exhaust gas amount control sub-routine is carried out in parallel according to steps S51 to S56 shown in FIG. 9. In the step S10, the electric pump 12 of the combustion promoting material injecting device 8 is energized, and then in the step S11, the solenoid valve 10b of the injector 10 is opened to inject the combustion promoting material toward the filter 7. This condition is memorized by setting a flag F to 1 in the step S12, and then a timer is set in the step S13. In the step S14, it is determined, on the basis of the timer set in the step S13, whether a predetermined time has lapsed since injection of the combustion promoting material began, the predetermined time being determined taking into account the time required for the combustible particulates to be satisfactorily burnt. When the time has lapsed, the timer is reset in the step S15 and the exhaust gas temperature T2 downstream of the filter 7, that is, the exhaust gas temperature raised by the combustion of the combustible particulates, is detected on the basis of the output signal of the second exhaust gas temperature sensor 25. In the step S17, it is determined whether the exhaust gas temperature T2 downstream of the filter 7 is higher than a limit of the exhaust gas temperature $T_B$ downstream of the filter 7 which is determined taking into account the lower limit of the exhaust gas temperature downstream of the filter 7 below which cracking of the filter 7 does not occur during combustion of the combustible particulates. When it is not determined that the former is higher than the latter, it is determined in the step S18 whether the electric pump 12 has been energized for a time interval which is determined corresponding to the injection amount Q determined in the step S7. When it is not determined that the electric pump 12 has been energized for the time interval, or it is determined that the injection of the combustion promoting material by the amount Q is not completed yet, the control circuit 22a returns to the step S16 to continue the injection. Otherwise, the control circuit 22a proceeds to the step S19, and closes the solenoid valve 10b of the injector 10. In the step S20, the electric pump 12 is deenergized to stop injection of the combustion promoting material. Finally, the flag F set to 1 in the step S12 is changed to 0 in the step S21, and then the control circuit 22a returns to the step S1. On the other hand, when it is determined that the exhaust gas temperature T2 downstream of the filter 7 is higher than the limit of the exhaust gas temperature $T_B$ downstream of the filter 7, it is considered that the burning temperature of the combustible particulates has become abnormally high, and the injection of the combustion promoting material is immediately stopped according to the steps S19 to S21.

In the exhaust gas amount control sub routine, the travel distance is detected on the basis of the output signal of the total odometer 24' in the step S51 and in step S52, it is determined whether the travel distance has reached a predetermined value since the preceding injection of the combustion promoting material. When it is determined that the travel distance has reached the predetermined value, a duty signal for reducing the opening degree of the flow control valve 14 to thereby increase the amount of exhaust gas flowing through the filter 7 is delivered to the duty solenoid valve 20 in the step S53. Otherwise a duty signal for increasing the opening degree of the flow control valve 14 to thereby reduce the amount of exhaust gas flowing through the filter 7 is delivered to the duty solenoid valve 20 in the step S54. Thus, the amount of exhaust gas flowing through the filter is kept at a preset value. In the step S55, it is determined whether the flag F in the combustion promoting material injection routine is 1 and the steps S51 to S55 are repeated until it is determined that the flag F is not 1 in the step S55. When it is determined that the flag F is not 1 but 0 in the step S55, the flow control valve 14 is closed to close the bypass exhaust passage 13 in the step S56, and thus, the exhaust gas amount control is ended.

Instead of the travel distance, the amount of fuel consumption can be used for determining the time the combustion promoting material is to be injected. In this case, the combustion promoting material is injected every predetermined amount of fuel consumption. This can be accomplished by providing an integrating fuel consumption meter to the fuel reservoir or taking out a signal from a float connected to the fuel gauge, for instance. This arrangement is advantageous in that the amount of the combustible particulates trapped by the filter 7 is substantially related to fuel consumption. Now the operation of the control circuit 22a when the amount of fuel consumption is used for determining the time the combustion promoting material is to be injected instead of the travel distance will be described with reference to FIGS. 10 and 11.

Figure 10:
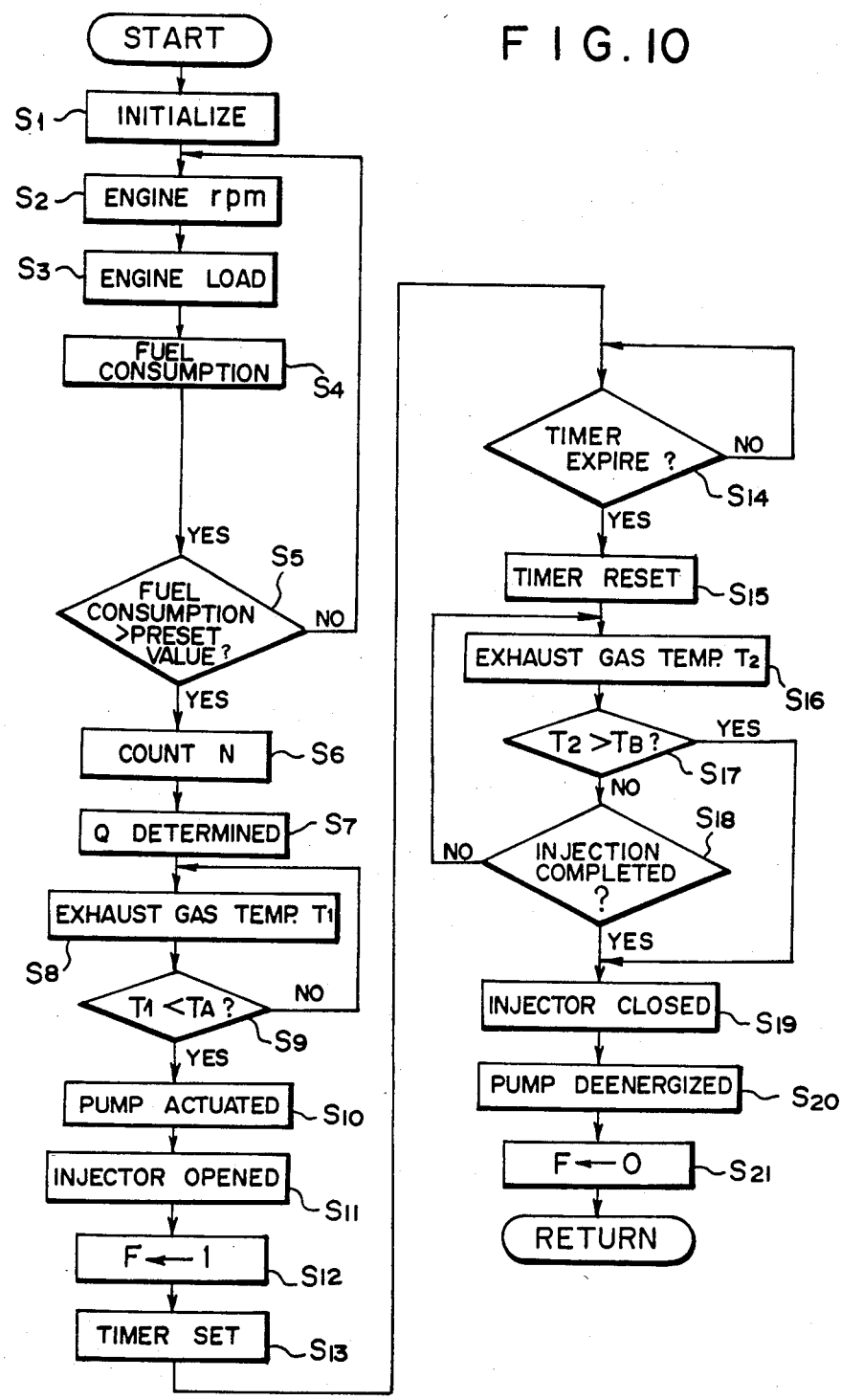

In FIG. 10, step S1 is an initializing step in which the flow control valve 14 is closed to close the bypass exhaust passage 13. In steps S2 and S3, the engine speed and the engine load are respectively detected on the basis of the shaft rpm and the control sleeve position of the fuel pump 4. In step S4, the amount of fuel consumption is detected and in step S5, it is determined whether the amount of fuel consumption has reached a predetermined value since the preceding injection of the combustion promoting material. When it is determined that the amount of fuel consumption has reached the predetermined value, the control circuit 22a proceeds to step S6. Otherwise, the control circuit 22a returns to the step S2 to repeat the steps S2 to S5. Thereafter, the control circuit 22a accomplishes steps S6 to S21 which are the same as the steps S6 to S21 in FIG. 8.

Figure 11:
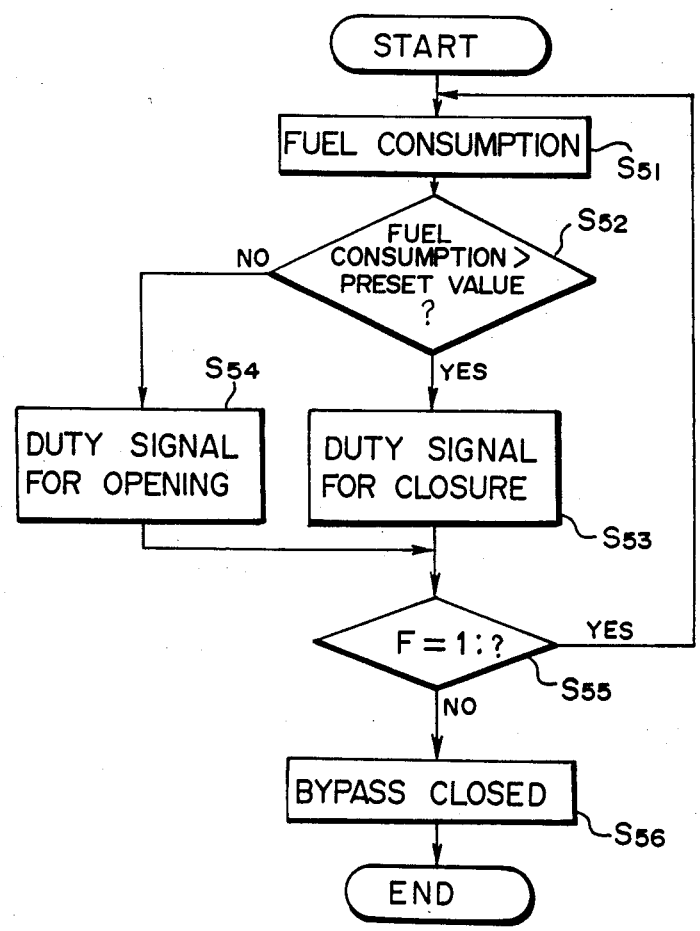

In the exhaust gas amount control sub routine shown in FIG. 11, the amount of fuel consumption is detected in the step S51, and in step S52 it is determined whether the amount of fuel consumption has reached a predetermined value since the preceding injection of the combustion promoting material. When it is determined that the amount of fuel consumption has reached the predetermined value, a duty signal for reducing the opening degree of the flow control valve 14 to thereby increase the amount of exhaust gas flowing through the filter 7 is delivered to the duty solenoid valve 20 in the step S53. Otherwise a duty signal for increasing the opening degree of the flow control valve 14 to thereby reduce the amount of exhaust gas flowing through the filter 7 is delivered to the duty solenoid valve 20 in the step S54. Thus, the amount of exhaust gas flowing through the filter is kept at a preset value. In the step S55, it is determined whether the flag F in the combustion promoting material injection routine is 1 and the steps S51 to S55 are repeated until it is determined that the flag F is not 1 in the step S55. When it is determined that the flag F is not 1 but 0 in the step S55, the flow control valve 14 is closed to close the bypass exhaust passage 13 in the step S56, and thus, the exhaust gas amount control is ended.

Figure 12:
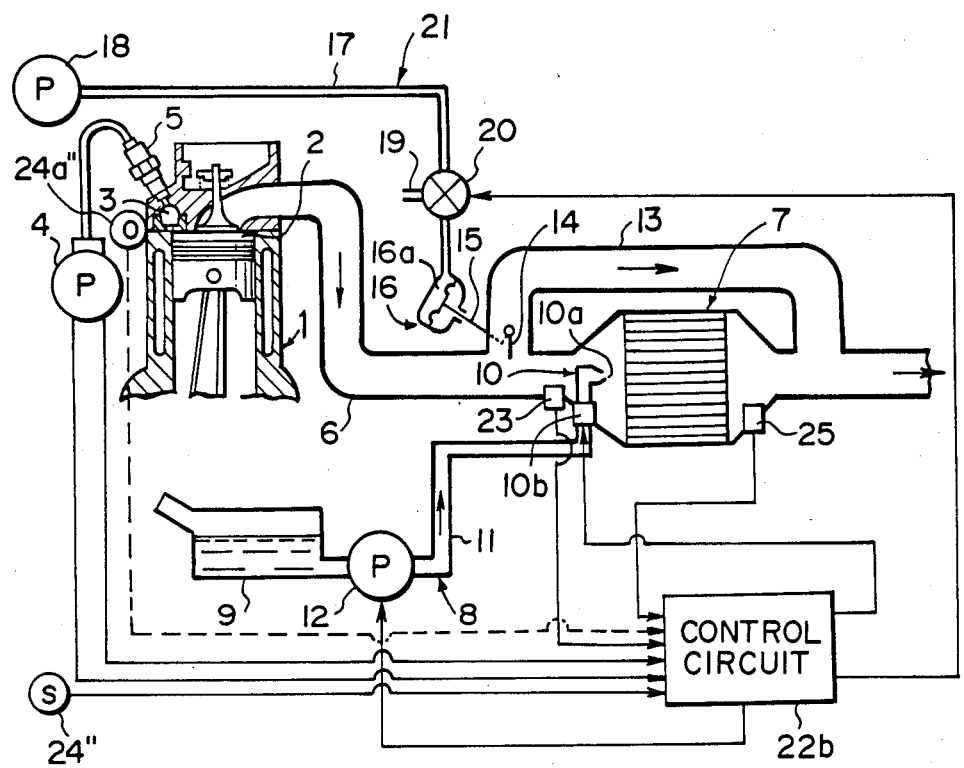
FIG. 12 is a schematic view of a diesel engine provided with an exhaust gas cleaning system in accordance with still another modification of the first embodiment.

In the exhaust gas cleaning system in accordance with still another modification shown in FIG. 12, the time the combustion promoting material is to be injected is determined according to the total of the actual operating time of the engine. The total of the actual operating time can be detected by integrating the time that the ignition switch 24″ is on or the time that the alternator 24″a (shown by the dotted line in FIG. 12) is operated.

Now the operation of the control circuit 22b when the total of the actual operating time of the engine is used for determining the time the combustion promoting material is to be injected will be described with reference to FIGS. 13 and 14.

Figure 13:
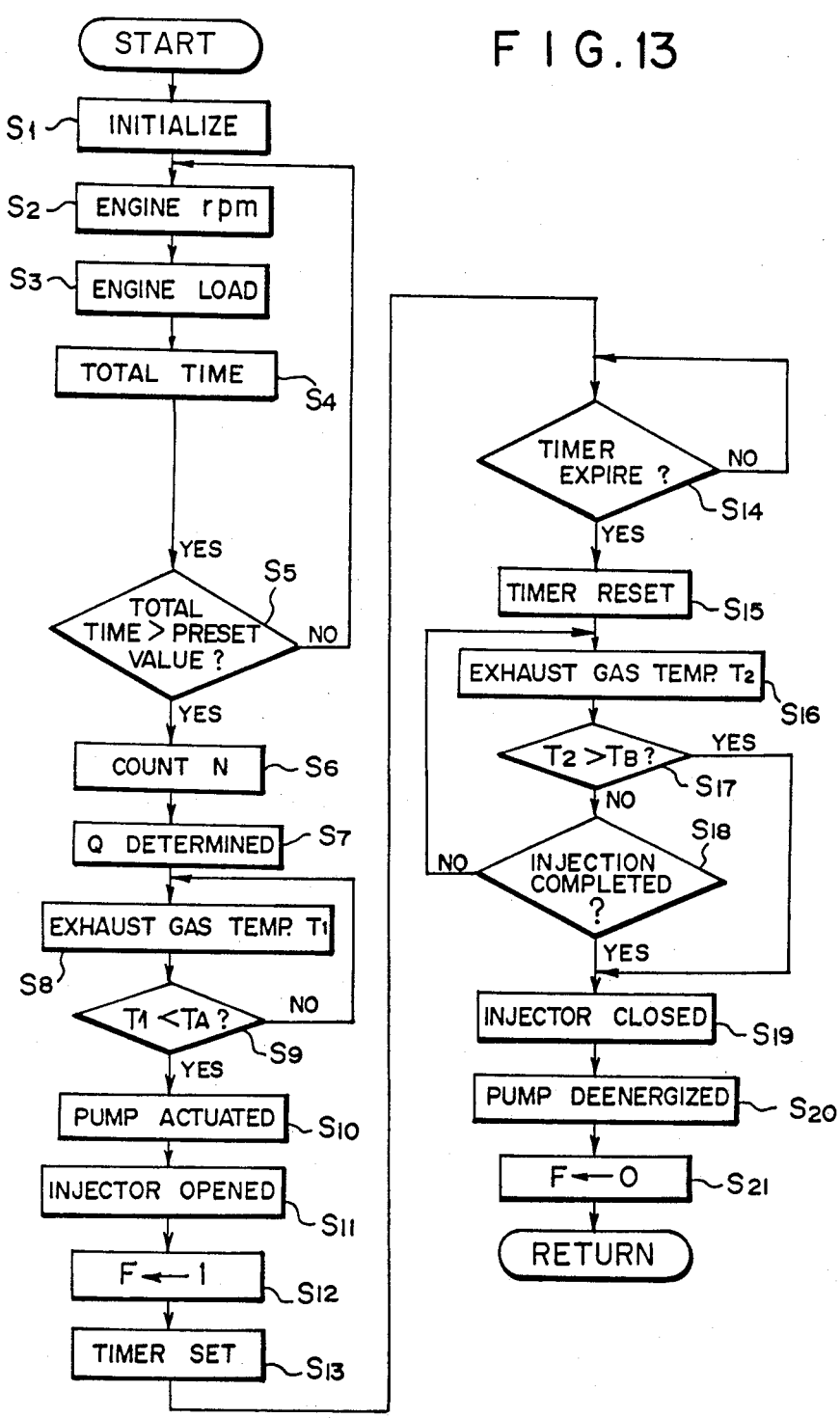
FIGS. 13 and 14 are flow charts for illustrating the operation of the control circuit employed in the exhaust gas cleaning system of FIG. 12.

In FIG. 13, step S1 is an initializing step in which the flow control valve 14 is closed to close the bypass exhaust passage 13. In steps S2 and S3, the engine speed and the engine load are respectively detected on the basis of the shaft rpm and the control sleeve position of the fuel pump 4. In step S4, the total of the actual operating time is detected on the basis of the output signal of the ignition switch 24″ or the alternator 24″a and in step S5, it is determined whether the total operating time has reached a predetermined value since the preceding injection of the combustion promoting material. When it is determined that the total operating time has reached the predetermined value, the control circuit 22b proceeds to step S6. Otherwise, the control circuit 22b returns to the step S2 to repeat the steps S2 to S5. Thereafter, the control circuit 22b accomplishes steps S6 to S21 which are the same as the steps S6 to S21 in FIG. 8.

Figure 14:
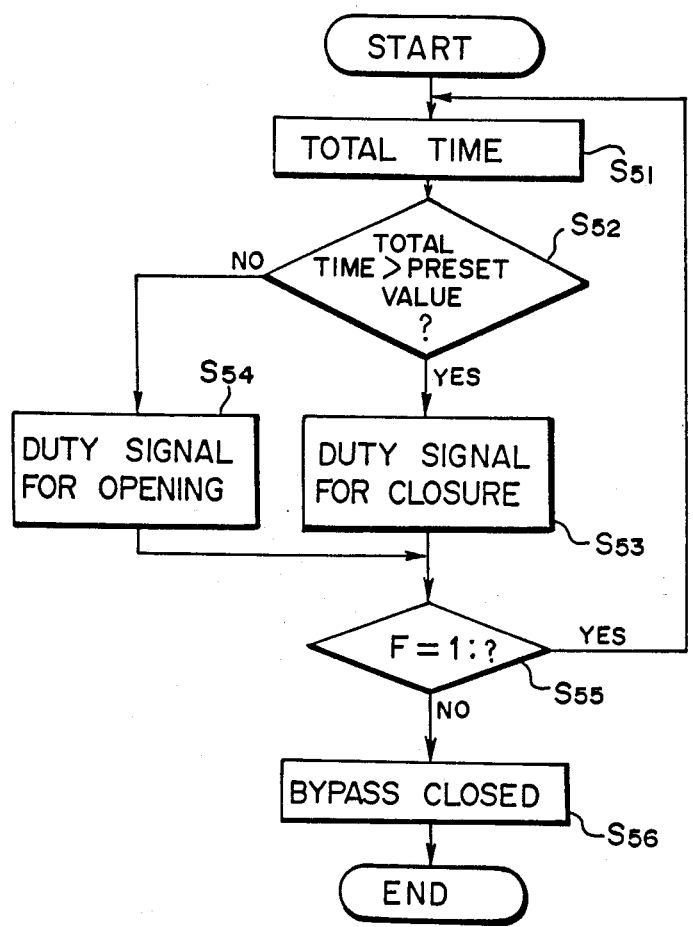

In the exhaust gas amount control sub routine shown in FIG. 14, the total operating time is detected in the step S51 and in step S52, it is determined whether the total operating time has reached a predetermined value since the preceding injection of the combustion promoting material. When it is determined that the total operating time has reached the predetermined value, a duty signal for reducing the opening degree of the flow control valve 14 to thereby increase the amount of exhaust gas flowing through the filter 7 is delivered to the duty solenoid valve 20 in the step S53. Otherwise a duty signal for increasing the opening degree of the flow control valve 14 to thereby reduce the amount of exhaust gas flowing through the filter 7 is delivered to the duty solenoid valve 20 in the step S54. Thus, the amount of exhaust gas flowing through the filter is kept at a preset value. In the step S55, it is determined whether the flag F in the combustion promoting material injection routine is 1 and the steps S51 to S55 are repeated until it is determined that the flag F is not 1 in the step S55. When it is determined that the flag F is not 1 but 0 in the step S55, the flow control valve 14 is closed to close the bypass exhaust passage 13 in the step S56, and thus, the exhaust gas amount control is ended.

In the exhaust gas cleaning system in accordance with still another modification shown in FIG. 15, the time the combustion promoting material is to be injected is determined according to the total of the number of revolutions of the engine. In this modification, the control circuit 22c integrates the output of an engine revolution detector 124 and permits injection of the combustion promoting material every predetermined number of revolutions of the engine.

Now the operation of the control circuit 22c in this modification will be described with reference to FIGS. 16 and 17.

Figure 16:
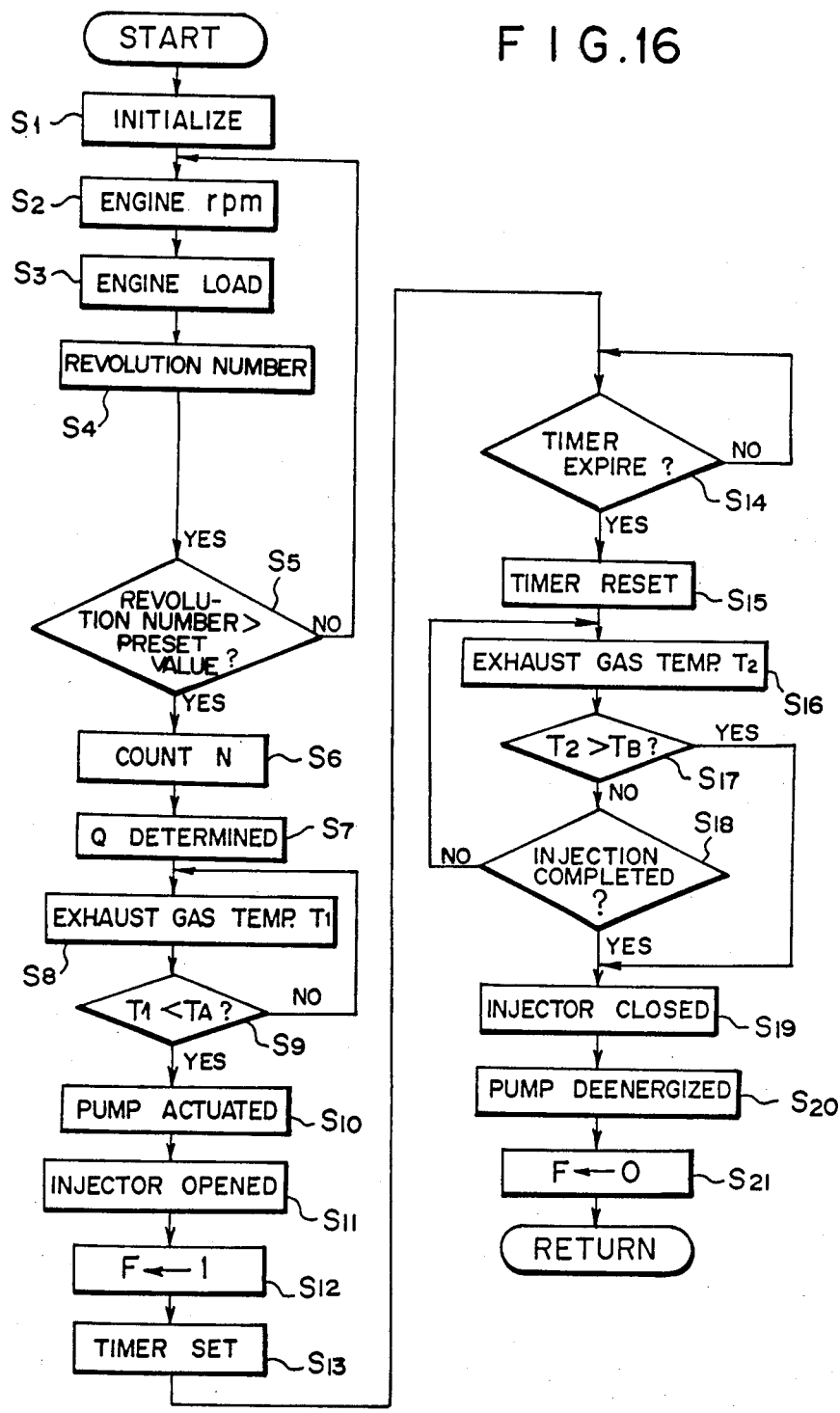
FIGS. 16 and 17 are flow charts for illustrating the operation of the control circuit employed in the exhaust gas cleaning system of FIG. 15.

In FIG. 16, step S1 is an initializing step in which the flow control valve 14 is closed to close the bypass exhaust passage 13. In steps S2 and S3, the engine load and the engine speed are respectively detected on the basis of the shaft rpm and the control sleeve position of the fuel pump 4. In step S4, the total number of the engine revolutions is detected and in step S5, it is determined whether the total number of engine revolutions has reached a predetermined value since the preceding injection of the combustion promoting material. When it is determined that the total number of engine revolutions has reached the predetermined value, the control circuit 22c proceeds to step S6. Otherwise, the control circuit 22c returns to the step S2 to repeat the steps S2 to S5. Thereafter, the control circuit 22c accomplishes steps S6 to S21 which are the same as the steps S6 to S21 in FIG. 8.

Figure 17:
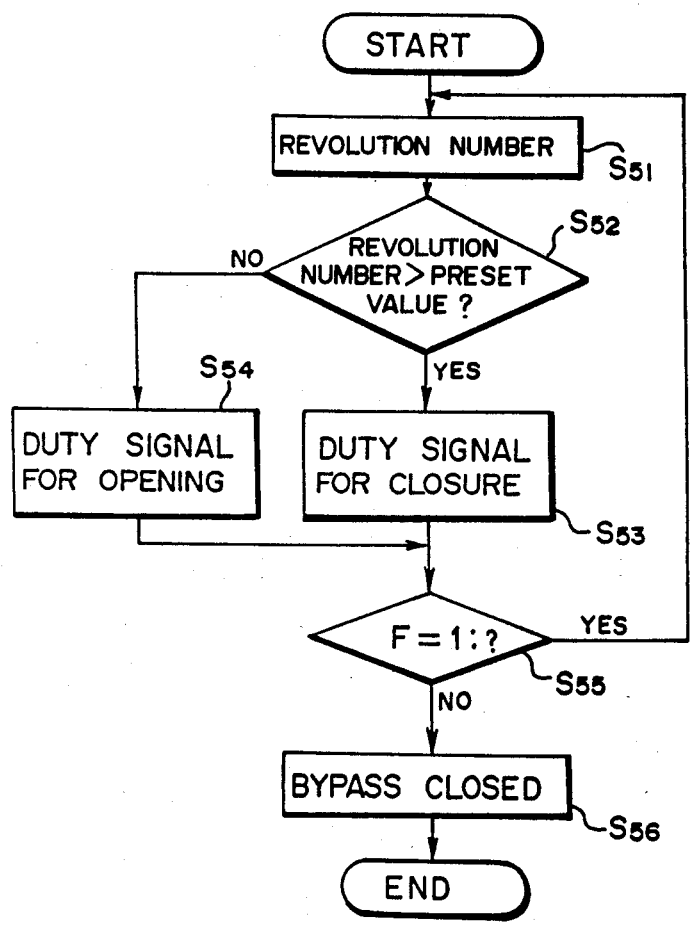

In the exhaust gas amount control sub routine shown in FIG. 17, the total number of engine revolutions is detected in the step S51 and in step S52, it is determined whether the total number of engine revolutions has reached a predetermined value since the preceding injection of the combustion promoting material. When it is determined that the total number of engine revolutions has reached the predetermined value, a duty signal for reducing the opening degree of the flow control valve 14 to thereby increase the amount of exhaust gas flowing through the filter 7 is delivered to the duty solenoid valve 20 in the step S53. Otherwise a duty signal for increasing the opening degree of the flow control valve 14 to thereby reduce the amount of exhaust gas flowing through the filter 7 is delivered to the duty solenoid valve 20 in the step S54. Thus, the amount of exhaust gas flowing through the filter is kept at a preset value. In the step S55, it is determined whether the flag F in the combustion promoting material injection routine is 1 and the steps S51 to S55 are repeated until it is determined that the flag F is not 1 in the step S55. When it is determined that the flag F is not 1 but 0 in the step S55, the flow control valve 14 is closed to close the bypass exhaust passage 13 in the step S56, and thus, the exhaust gas amount control is ended.

The electrical resistance of the particulate filter 7 is reduced as the amount of the catalytic component increases as described above in conjunction with FIG. 5. Accordingly, the time the combustion promoting material is to be injected can be determined by detecting the resistance of the particulate filter 7. In a still another embodiment of the present invention, the control circuit 22d receives the output of a resistance sensor which may comprise a pair of opposed terminals disposed in the particulate filter 7 and detects the electrical resistance of the particulate filter 7, and permits injection of the combustion promoting material when reduction in the electrical resistance of the particulate filter 7 has reached a predetermined value.

Now the operation of the control circuit 22d will be described with reference to FIGS. 19 and 20.

Figure 19:
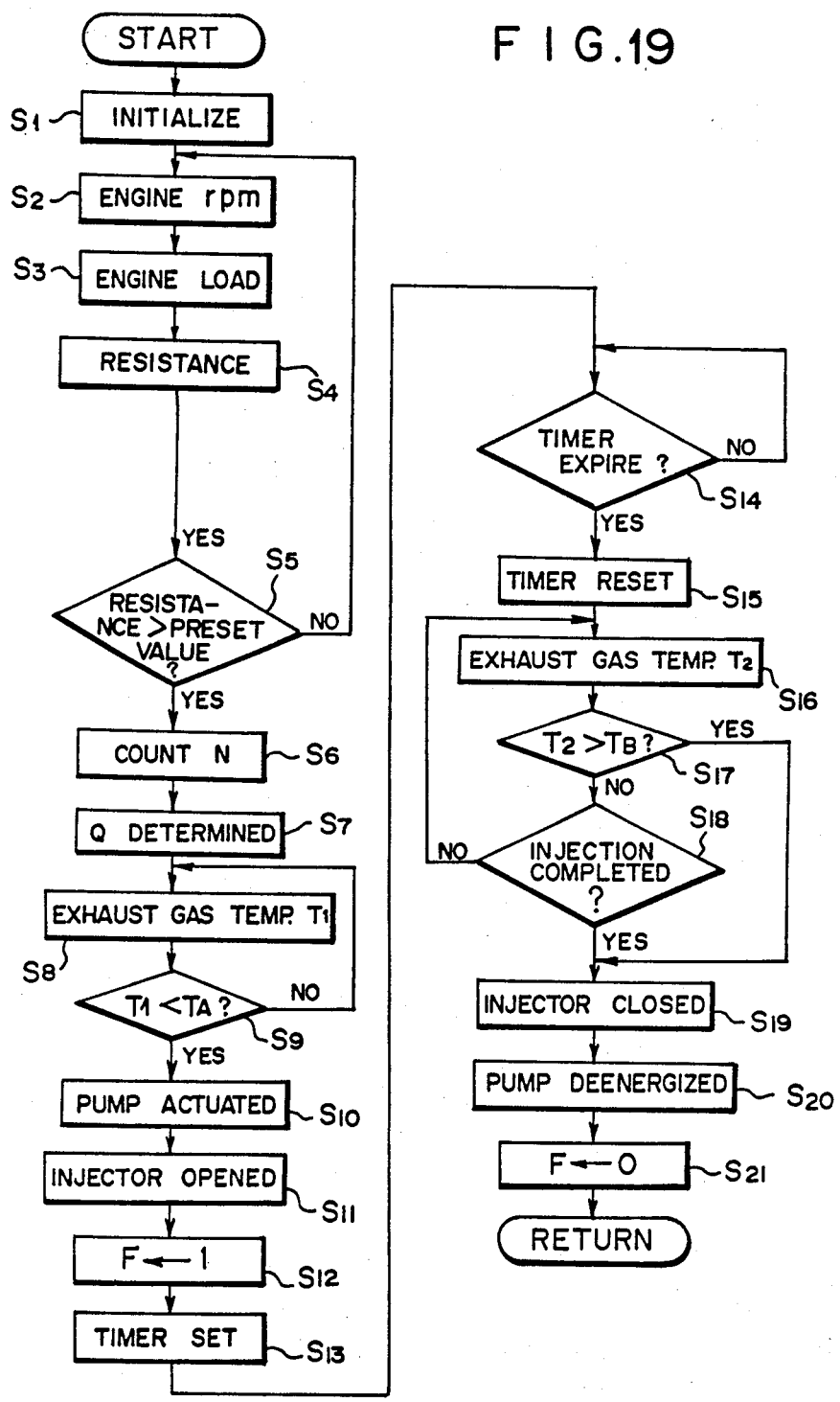
FIGS. 19 and 20 are flow charts for illustrating the operation of the control circuit employed in the exhaust gas cleaning system of FIG. 18, FIGS. 21 and 22 are flow charts for illustrating the operation of the control circuit employed in an exhaust gas cleaning system in accordance with still another modification of the first embodiment.

In FIG. 19, step S1 is an initializing step in which the flow control valve 14 is closed to close the bypass exhaust passage 13. In steps S2 and S3, the engine speed and the engine load are respectively detected on the basis of the shaft rpm and the control sleeve position of the fuel pump 4. In step S4, the reduction in the electrical resistance of the particulate filter 7 is detected on the basis of the output signal of the resistance sensor 224 and in step S5, it is determined whether the reduction in electrical resistance of the particulate filter 7 due to deposition of the catalytic component has reached a predetermined value since the preceding injection of the combustion promoting material. When it is determined that the reduction in electrical resistance has reached the predetermined value, the control circuit 22d proceeds to step S6. Otherwise, the control circuit 22d returns to the step S2 to repeat the steps S2 to S5. Thereafter, the control circuit 22d accomplishes steps S6 to S21 which are the same as the steps S6 to S21 in FIG. 8.

Figure 20:
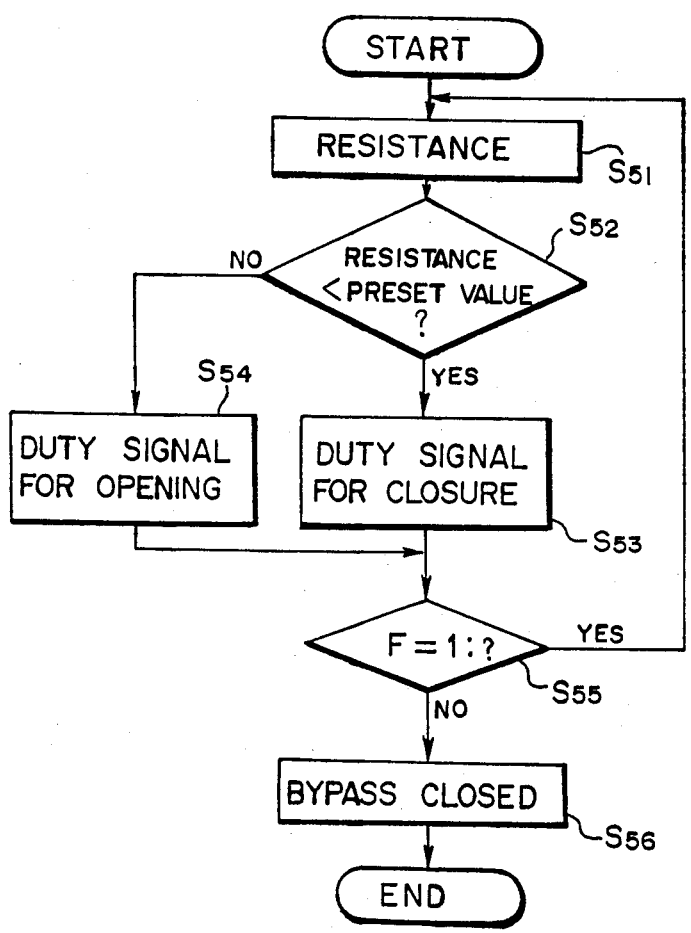

In the exhaust gas amount control sub routine shown in FIG. 20, the reduction in electrical resistance is detected in the step S51 and in step S52, it is determined whether the reduction in electrical resistance has reached a predetermined value since the preceding injection of the combustion promoting material. When it is determined that the reduction in electrical resistance has reached the predetermined value, a duty signal for reducing the opening degree of the flow control valve 14 to thereby increase the amount of exhaust gas flowing through the filter 7 is delivered to the duty solenoid valve 20 in the step S53. Otherwise a duty signal for increasing the opening degree of the flow control valve 14 to thereby reduce the amount of exhaust gas flowing through the filter 7 is delivered to the duty solenoid valve 20 in the step S54. Thus, the amount of exhaust gas flowing through the filter is kept at a preset value. In the step S55, it is determined whether the flag F in the combustion promoting material injection routine is 1 and the steps S51 to S55 are repeated until it is determined that the flag F is not 1 in the step S55. When it is determined that the flag F is not 1 but 0 in the step S55, the flow control valve 14 is closed to close the bypass exhaust passage 13 in the step S56, and thus, the exhaust gas amount control is ended.

Figure 21:
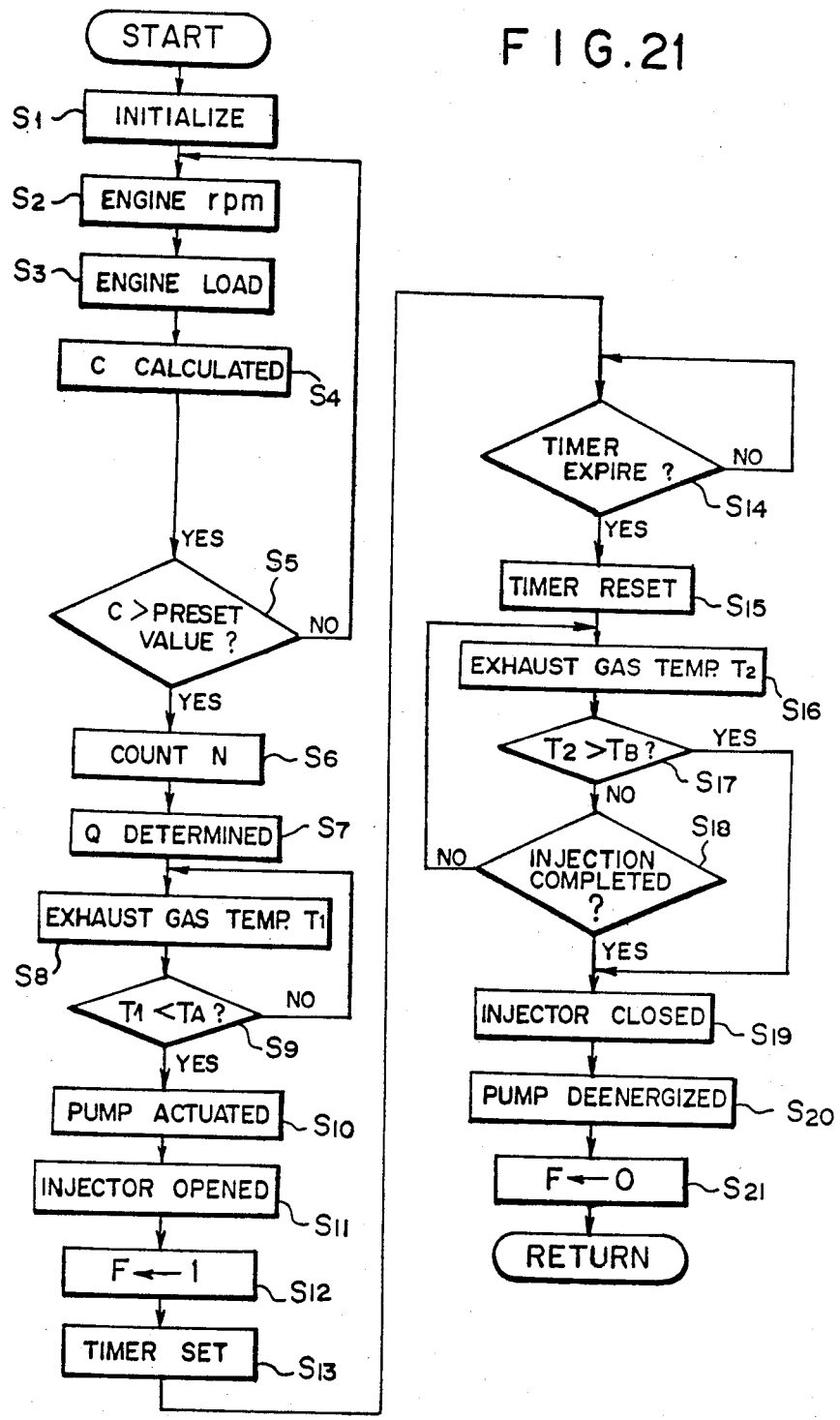
Figure 22:
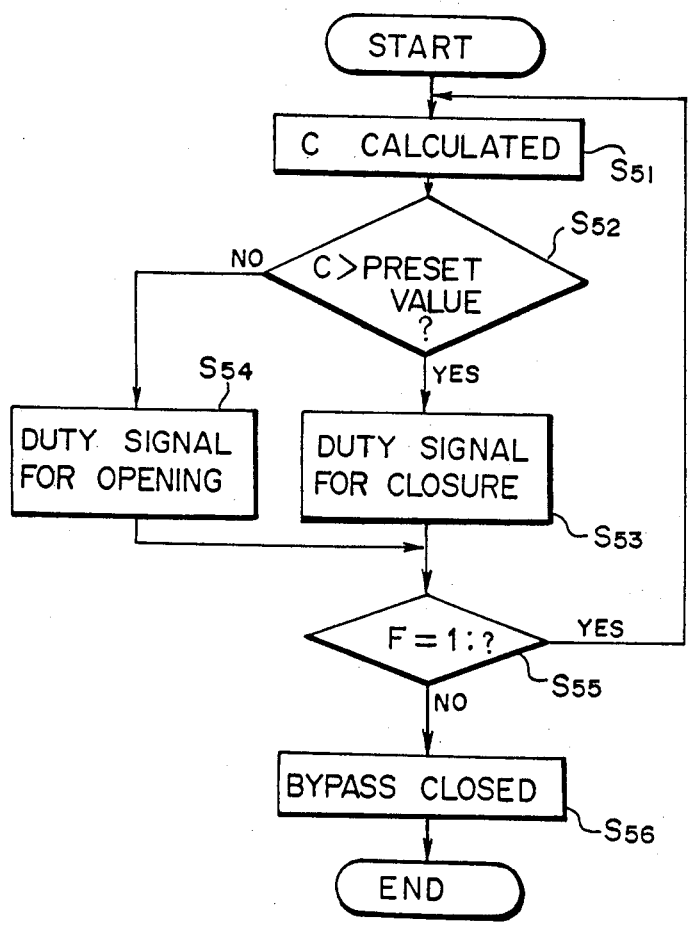

FIGS. 21 and 22 show the operation of the control circuit of an exhaust gas cleaning system in accordance with still another modification. The exhaust gas cleaning system of this modification is mechanically the same as that shown in FIG. 1 except that the back pressure sensor 24 is not necessary. In this modification, the control circuit calculates a function formula including the engine speed and the engine load as two parameters, and permits injection of the combustion promoting material when the integration of the function formula exceeds a predetermined value. In FIG. 21, step S1 is an initializing step in which the flow control valve 14 is closed to close the bypass exhaust passage 13. In steps S2 and S3, the engine speed and the engine load are respectively detected on the basis of the shaft rpm and the control sleeve position of the fuel pump 4. In step S4, the integration C of a predetermined function formula $C = \int f(x_1, x_2) dx$ (wherein $x_1$ and $x_2$ respectively represent the engine speed and the engine load) is calculated, and in step S5, it is determined whether the value of the integration C exceeds a predetermined value since the preceding injection of the combustion promoting material. When it is determined that the value of the integration C exceeds the predetermined value, the control circuit proceeds to step S6. Otherwise, the control circuit returns to the step S2 to repeat the steps S2 to S5. Thereafter, the control circuit accomplishes steps S6 to S21 which are the same as the steps S6 to S21 in FIG. 8.

In the exhaust gas amount control sub routine shown in FIG. 22, the value of the integration C is calculated in the step S51 and in step S52, it is determined whether the value of the integration C exceeds a predetermined value since the preceding injection of the combustion promoting material. When it is determined that the value of the integration C exceeds the predetermined value, a duty signal for reducing the opening degree of the flow control valve 14 to thereby increase the amount of exhaust gas flowing through the filter 7 is delivered to the duty solenoid valve 20 in the step S53. Otherwise a duty signal for increasing the opening degree of the flow control valve 14 to thereby reduce the amount of exhaust gas flowing through the filter 7 is delivered to the duty solenoid valve 20 in the step S54. Thus, the amount of exhaust gas flowing through the filter is kept at a preset value. In the step S55, it is determined whether the flag F in the combustion promoting material injection routine is 1 and the steps S51 to S55 are repeated until it is determined that the flag F is not 1 in the step S55. When it is determined that the flag F is not 1 but 0 in the step S55, the flow control valve 14 is closed to close the bypass exhaust passage 13 in the step S56, and thus, the exhaust gas amount control is ended.

Instead of the function formula including the engine speed and the engine load as parameters, a function formula including at least two of travel distance, fuel consumption, engine operating time, engine revolution number, engine load and electrical resistance of the particulate filter may be used in order to more properly determine the time the combustion promoting material is to be injected.

Still another embodiment of the present invention will be described with reference to FIGS. 23 and 24.

Figure 23:
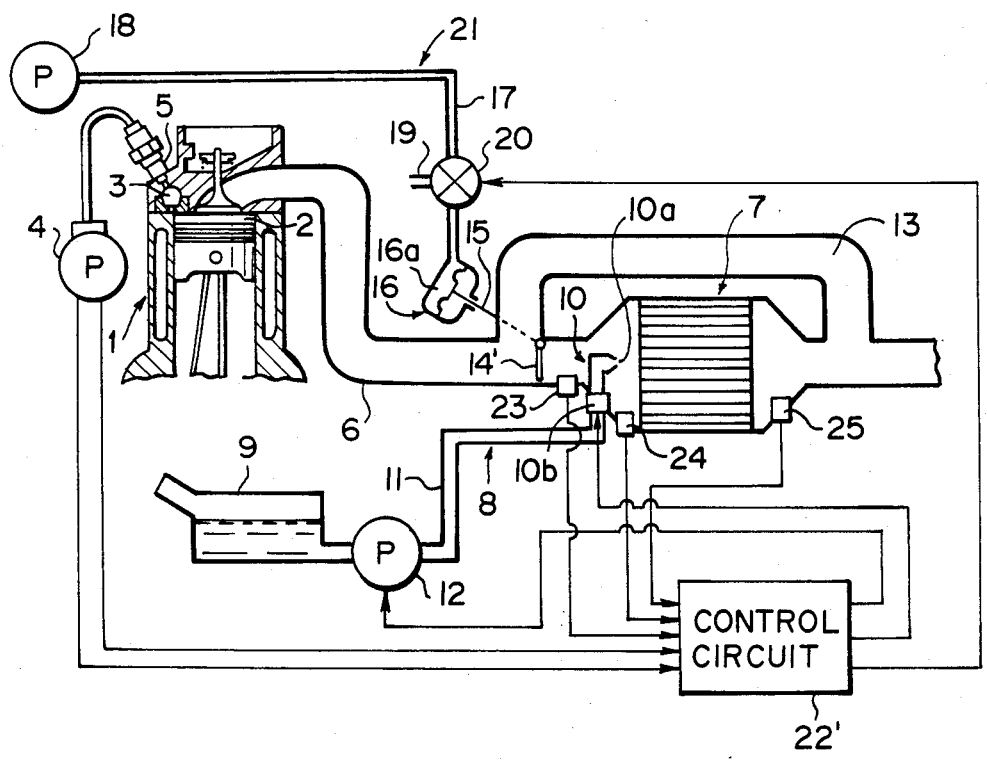
FIG. 23 is a view similar to FIG. 1 but showing a diesel engine provided with an exhaust gas cleaning system in accordance with another embodiment of the present invention.

The exhaust gas cleaning system of this embodiment is very similar to that shown in FIG. 1 except that there is provided, instead of the flow control valve 14, a change-over valve 14' which is moved between a first position shown by the solid line in FIG. 23 in which it prevents the exhaust gas from flowing into the filter 7 and causes all the exhaust gas to flow through the bypass exhaust passage 13, and a second position in which it prevents the exhaust gas from flowing into the bypass exhaust passage 13 and causes the whole exhaust gas to flow into the filter 7. Accordingly, the parts analogous to the parts shown in FIG. 1 are given the same reference numerals and will not be described here. The change-over valve 14' is driven by the diaphragm device 16 under the control of the three-way solenoid valve 20 similarly to the flow control valve 14 in the first embodiment.

When it is determined that the filter 7 is clogged, the control circuit 22' controls the three-way solenoid valve 20 to move the change-over valve 14' to the first position so that no exhaust gas flows into the filter 7, and compares the actual exhaust gas temperature T1 upstream of the filter 7 with a preset temperature $T_A$ which is determined taking into account the boiling temperature of the solvent of the combustion promoting material, and when the former is not higher than the latter, the control circuit 22' permits injection of the combustion promoting material.

The operation of the control circuit 22' will be described in more detail with reference to the flow chart shown in FIG. 24, hereinbelow.

Figure 24:
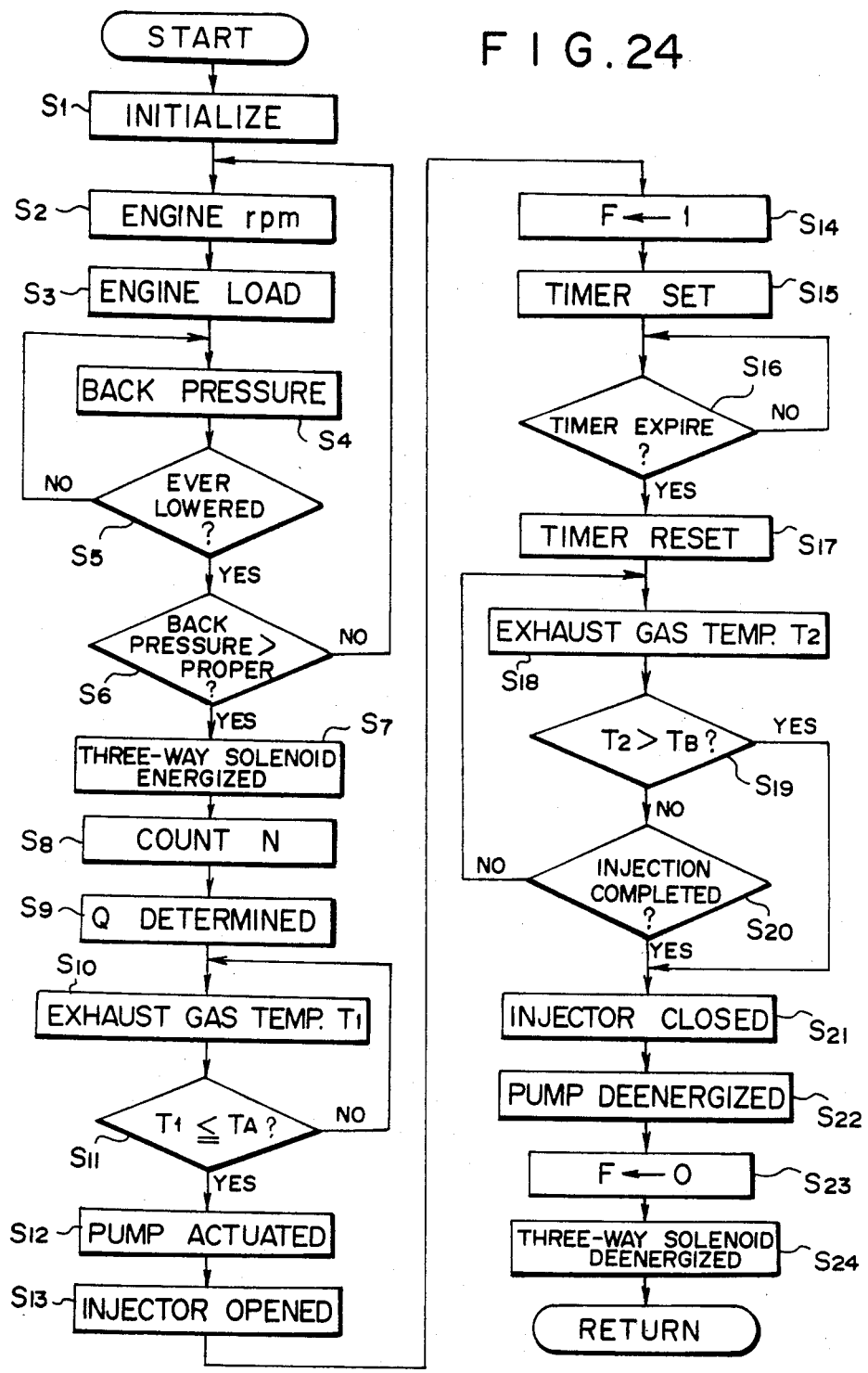
FIG. 24 is a flow chart for illustrating the operation of the control circuit employed in the exhaust gas cleaning system of FIG. 23.

In FIG. 24, step S1 is an initializing step in which the change-over valve 14' is moved to the first position to close the bypass exhaust passage 13. In steps S2 and S3, the engine speed and the engine load are respectively detected on the basis of the shaft rpm and the control sleeve position of the fuel pump 4. In step S4, the back pressure of the engine 1 is detected on the basis of the output signal of the back pressure sensor 24, and in step S5 it is determined whether the back pressure has ever been lowered to a proper value which is predetermined for the operating range of the engine 1 detected in the steps S2 and S3, that is, it is determined whether the combustible particulates trapped by the filter 7 have ever been burnt. When it is not determined that the back pressure has been once lowered to the predetermined proper back pressure, the control circuit 22' returns to the step S4 to repeat the steps S4 and S5. When it is determined that the back pressure has been once lowered to the predetermined proper back pressure in the step S5, it is determined in step S6 whether the back pressure detected in the step S4 is higher than the predetermined proper back pressure, that is, whether the particulate filter 7 is clogged by the combustible particulates trapped thereby. When it is determined that the filter 7 is clogged, the control circuit 22' proceeds to step S7. Otherwise, the control circuit 22' returns to the step S2 to repeat the steps S2 to S6.

In the step S7, the three-way solenoid valve 20 is energized to move the change-over valve 14' to the second position, thereby opening the bypass exhaust passage 13 and preventing the exhaust gas from entering the filter 7. In the next step S8, the number of injections N of the combustion promoting material which have been made by that time is counted, and in step S9, the amount of the combustion promoting material to be injected at that time Q is read out from the map shown in FIG. 4 in which the amount of the combustion promoting material to be injected Q is related to the number of injections N.

After the injection amount Q is thus determined, the exhaust gas temperature T1 of the engine 1 is detected on the basis of the output of the first exhaust gas temperature sensor 23 in step S10. Further, in step S11, it is determined whether the exhaust gas temperature T1 is lower than said preset temperature $T_A$ which is determined taking into account the boiling temperature of the solvent of the combustion promoting material. When it is not determined that the former is lower than the latter, the control circuit 22' returns to the step S10 to repeat the steps S10 and S11 until the former becomes lower than the latter.

When it is determined that the former is lower than the latter in the step S11, a combustion promoting material injecting routine is carried out according to steps S12 to S24, and an exhaust gas amount control sub-routine is carried out in parallel according to steps S51 to S56 shown in FIG. 3. In the step S12, the electric pump 12 of the combustion promoting material injecting device 8 is energized, and then in the step S13, the solenoid valve 10b of the injector 10 is opened to inject the combustion promoting material toward the filter 7. This condition is memorized by setting a flag F to 1 in the step S14, and then a timer is set in the step S15. In the step S16, it is determined, on the basis of the timer set in the step S15, whether a predetermined time has lapsed since injection of the combustion promoting material begins, the predetermined time being determined taking into account the time required for the combustible particulates to be satisfactorily burnt. When the time has expired, the timer is reset in the step S17 and the exhaust gas temperature T2 downstream of the filter 7, that is, the exhaust gas temperature raised by the combustion of the combustible particulates, is detected on the basis of the output signal of the second exhaust gas temperature sensor 25 in the step S18. In the step S19, it is determined whether the exhaust gas temperature T2 downstream of the filter 7 is higher than a limit of the exhaust gas temperature $T_B$ downstream of the filter 7 which is determined taking into account the lower limit of the exhaust gas temperature downstream of the filter 7 below which cracking of the filter 7 does not occur during combustion of the combustible particulates. When it is not determined that the former is higher than the latter, it is determined in the step S20 whether the electric pump 12 has been energized for a time interval which is determined corresponding to the injection amount Q determined in the step S9. When it is not determined that the electric pump 12 has been energized for the time interval, or it is determined that the injection of the combustion promoting material by the amount Q is not completed yet, the control circuit 22' returns to the step S18 to continue the injection. Otherwise, the control circuit 22' proceeds to the step S21, and closes the solenoid valve 10b of the injector 10. In the step S22, the electric pump 12 is deenergized to stop injection of the combustion promoting material. Finally, the flag F set to 1 in the step S14 is changed to 0 in the step S23, and then the three-way solenoid valve 20 is deenergized to return the change-over valve 14' to the second position. Thereafter, the control circuit 22' returns to the step S1. On the other hand, when it is determined that the exhaust gas temperature T2 downstream of the filter 7 is higher than the limit of the exhaust gas temperature $T_B$ downstream of the filter 7, it is considered that the burning temperature of the combustible particulates has become abnormally high, and the injection of the combustion promoting material is immediately stopped according to the steps S21 to S24.

Thus, in this embodiment, while the combustion promoting material, which is liquid in this particular embodiment, is injected toward the particulate filter 7, flow of the exhaust gas into the filter is stopped by moving the change-over valve to the first position. Accordingly, the combustion promoting material can be injected in an optimal manner so that the material can uniformly adhere to the surface of the filter 7 over the entire area thereof, whereby the filter 7 can be refreshed in an optimal manner.

Further, since the combustion promoting material is injected only when the exhaust gas temperature T1 upstream of the filter 7 is lower than the preset temperature determined taking into account the boiling temperature of the solvent, vaporization of the solvent is limited and growth of crystal of the catalytic component is limited. Therefore, the combustion promoting material can be uniformly deposited on the surface of the combustible particulates over the entire area thereof, whereby the filter 7 can be refreshed more efficiently.

What is claimed is:

1. An exhaust gas cleaning system for an internal combustion engine comprising a particulate filter which is provided in the exhaust system of the engine to trap combustible particulates contained in exhaust gas discharged from the engine, a combustion promoting material injecting device which is disposed in the exhaust system upstream of the particulate filter to inject a combustion promoting material for promoting combustion of the combustible particulates trapped by the particulate filter, a bypass exhaust passage which connects a portion of the exhaust passage upstream of the combustion promoting material injecting device and a portion of the same downstream of the particulate filter bypassing the combustion promoting material injecting device and the particulate filter, a control valve means for controlling flow of the exhaust gas into the particulate filter, and a control means which controls the time the combustion promoting material injecting device injects the combustion promoting material and controls the control valve means so that the amount of the exhaust gas flowing into the filter is adjusted to a preset amount while the combustion promoting material injecting device injects the combustion promoting material.

2. An exhaust gas cleaning system as defined in claim 1 in which said flow control valve means is a flow control valve which is disposed in the bypass exhaust passage to control the amount of the exhaust gas flowing through the bypass exhaust passage, thereby controlling the flow of exhaust gas into the particulate filter.

3. An exhaust gas cleaning system as defined in claim 2 in which said control means controls the flow control valve means so that the amount of exhaust gas flowing through the bypass exhaust passage increases as the engine speed increases.

4. An exhaust gas cleaning system as defined in claim 1 in which said combustion promoting material is a liquid.

5. An exhaust gas cleaning system as defined in claim 1 in which said liquid is a mixture of a catalytic liquid and a hydrocarbon liquid.

6. An exhaust gas cleaning system as defined in claim 1 further comprising means for establishing an electromagnetic field between the combustion promoting material injecting device and the particulate filter and means for charging the combustion promoting material.

7. An exhaust gas cleaning system as defined in claim 6 in which said filter is of a honeycomb structure and said means for establishing the electro-magnetic field and means for charging the combustion promoting material comprise a plurality of elongated electrodes which are inserted into the passages of the filter from the downstream side end thereof, the length of the electrode being the maximum at the center of the filter and decreasing toward the periphery, and means for applying a voltage of the same polarity to the combustion promoting material injecting device and the electrodes.

8. An exhaust gas cleaning system as defined in claim 1 in which the amount of the combustion promoting material to be injected is reduced as the number of injections increases.

9. An exhaust gas cleaning system as defined in claim 1 in which said control means causes the combustion promoting material injecting device to inject the combustion promoting material in response to an output signal from a clogging detecting means which represents that the filter is clogged.

10. An exhaust gas cleaning system as defined in claim 9 in which said control means first controls the control valve means to adjust the amount of the exhaust gas flowing into the filter and then permits the combustion promoting material injecting device to inject the combustion promoting material when the combustion promoting material is to be injected.

11. An exhaust gas cleaning system as defined in claim 9 in which said clogging detecting means comprises a pressure sensor for detecting the pressure of exhaust gas.

12. An exhaust gas cleaning system as defined in claim 11 in which said pressure sensor is disposed in the exhaust system upstream of the particulate filter.

13. An exhaust gas cleaning system as defined in claim 12 in which said flow control valve means is a flow control valve which is disposed in the bypass exhaust passage to control the amount of the exhaust gas flowing through the bypass exhaust passage, thereby controlling the flow of exhaust gas into the particulate filter, and said control means controls the flow control valve means so that the amount of exhaust gas flowing through the bypass exhaust passage increases as the engine speed increases.

14. An exhaust gas cleaning system as defined in claim 11 in which said control means determines a proper back pressure for the detected engine speed represented by an output signal of an engine speed sensor, and compares the proper back pressure with the detected back pressure input from the pressure sensor to control the combustion promoting material injecting device and the control valve means on the basis of the comparison.

15. An exhaust gas cleaning system as defined in claim 9 in which said clogging detecting means comprises an odometer and outputs said output signal every predetermined travel distance.

16. An exhaust gas cleaning system as defined in claim 9 in which said clogging detecting means comprises an integrating fuel consumption meter and outputs said output signal every predetermined amount of fuel consumption.

17. An exhaust gas cleaning system as defined in claim 9 in which said clogging detecting means comprises means for detecting the total of the actual operating time of the engine and outputs said output signal every predetermined operating time interval of the engine.

18. An exhaust gas cleaning system as defined in claim 9 in which said clogging detecting means comprises means for detecting the total of the number of the engine revolutions and outputs said output signal every predetermined number of the engine revolutions.

19. An exhaust gas cleaning system as defined in claim 9 in which said clogging detecting means comprises means for detecting the electrical resistance of the particulate filter and outputs said output signal when reduction in the electrical resistance of the particulate filter exceeds a predetermined value.

20. An exhaust gas cleaning system as defined in claim 9 in which said clogging detecting means outputs said output signal when the value of a predetermined function formula including the engine speed and the engine load as parameters exceeds a predetermined value.

21. An exhaust gas cleaning system as defined in claim 1 in which said control means comprises an exhaust gas temperature detecting means and compares the exhaust gas temperature with an acceptable limit of the exhaust gas temperature which is determined taking into account the lower limit of the exhaust gas temperature below which cracking of the filter does not occur during combustion of the combustible particulates caused by injection of the combustion promoting material, the control means determining whether the combustion promoting material is to be injected or injection of the combustion promoting material is to be continued on the basis of the comparison.

22. An exhaust gas cleaning system as defined in claim 21 in which said exhaust gas temperature detecting means comprises a first temperature sensor which detects the exhaust gas temperature upstream of the particulate filter, and a second temperature sensor which detects the exhaust gas temperature downstream of the particulate filter, and inhibits injection of the combustion promoting material when the exhaust gas temperature upstream of the particulate filter is higher than an acceptable limit of the exhaust gas temperature which is determined taking into account the lower limit of the exhaust gas temperature upstream of the particulate filter below which cracking of the filter does not occur during combustion of the combustible particulates caused by injection of the combustion promoting material, and interrupts injection of the combustion promoting material when the exhaust gas temperature downstream the particulate filter raised above a predetermined limit which is determined taking into account the critical exhaust gas temperature downstream of the particulate filter above which cracking of the filter can occur.

23. An exhaust gas cleaning system as defined in claim 1 in which said control valve means is a changeover valve which is moved between a first position in which it prevents the exhaust gas from flowing into the particulate filter and causes all the exhaust gas to flow through the bypass exhaust passage, and a second position in which it prevents the exhaust gas from flowing into the bypass exhaust passage and causes the whole exhaust gas to flow into the particulate filter, and said control means moves the changeover valve to the first position.

24. An exhaust gas cleaning system as defined in claim 23 in which said control means moves the changeover switch to the first position when the combustion promoting material is to be injected, and permits the combustion promoting material injecting device to inject the combustion promoting material when the temperature in the exhaust system upstream of the particulate filter is lower than a preset temperature.

* * * * *